(12) United States Patent
Mickelson et al.

(10) Patent No.: US 9,948,423 B2
(45) Date of Patent: Apr. 17, 2018

(54) VARIATION-TOLERANT WAVELENGTH DIVISION MULTIPLEXING RECEIVER AND TRANSCEIVER, AND ASSOCIATED METHODS

(71) Applicant: The Regents Of The University Of Colorado, a body corporate, Denver, CO (US)

(72) Inventors: Alan Mickelson, Boulder, CO (US); Zheng Li, San Jose, CA (US); Moustafa Mohamed, Redmond, WA (US); Xi Chen, Ningde (CN)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 111 days.

(21) Appl. No.: 15/033,520

(22) PCT Filed: Oct. 31, 2014

(86) PCT No.: PCT/US2014/063584
§ 371 (c)(1),
(2) Date: Apr. 29, 2016

(87) PCT Pub. No.: WO2015/066555
PCT Pub. Date: May 7, 2015

(65) Prior Publication Data
US 2016/0285581 A1    Sep. 29, 2016

Related U.S. Application Data

(60) Provisional application No. 61/898,358, filed on Oct. 31, 2013.

(51) Int. Cl.
*H04J 14/00* (2006.01)
*H04J 14/02* (2006.01)
(Continued)

(52) U.S. Cl.
CPC .......... *H04J 14/0254* (2013.01); *H04B 10/40* (2013.01); *H04B 10/516* (2013.01); *H04B 10/671* (2013.01); *H04B 10/801* (2013.01)

(58) Field of Classification Search
CPC .... H04J 14/02; H04J 14/0201; H04J 14/0202; H04J 14/021; H04J 14/0215; G02B 6/12007; G02B 6/2938
See application file for complete search history.

(56) References Cited

U.S. PATENT DOCUMENTS

2002/0172311 A1    11/2002  Chen et al.
2007/0171001 A1    7/2007   Naniwada et al.
(Continued)

OTHER PUBLICATIONS

International Search Report and Written Opinion corresponding to International Application No. PCT/US2014/63584, dated Feb. 24, 2015, 8 pages.

*Primary Examiner* — Daniel Dobson
(74) *Attorney, Agent, or Firm* — Lathrop Gage LLP

(57) ABSTRACT

A variation-tolerant receiver includes a plurality of receiver resonators configured to demultiplex a multiplexed modulated signal received from at least one wavelength division multiplexing (WDM) transmitter having a plurality of transmitter resonators and wherein operationally each of the receiver resonators has a receiver resonance linewidth not exceeding a minimum spacing between two adjacent transmitter resonances of the transmitter resonators, the receiver resonances collectively spanning a free spectral range of one of the receiver resonators such that the variation-tolerant receiver achieves gapless spectral response. A method passively compensates transmitter-receiver channel mismatch in a transceiver by: separating a broadband carrier into a plurality of narrowband transmitter carriers; modulating the narrowband transmitter carriers to form a plurality of modulated signals; multiplexing each of the modulated signals to (Continued)

form a multiplexed modulated signal; and demultiplexing the multiplexed modulated signal onto a plurality of receiver channels.

20 Claims, 14 Drawing Sheets

(51) Int. Cl.
*H04B 10/40* (2013.01)
*H04B 10/67* (2013.01)
*H04B 10/80* (2013.01)
*H04B 10/516* (2013.01)
*H04B 10/00* (2013.01)

(56) References Cited

U.S. PATENT DOCUMENTS

| | | | |
|---|---|---|---|
| 2009/0269069 | A1 | 10/2009 | Mahgerefteh et al. |
| 2010/0329685 | A1* | 12/2010 | Zheng .................. G02F 1/0147 398/83 |
| 2012/0177060 | A1* | 7/2012 | Lipson ............... G02B 6/12007 370/464 |
| 2012/0237155 | A1* | 9/2012 | Zheng ............... G02B 6/12007 385/2 |
| 2014/0314406 | A1* | 10/2014 | Zerbe ..................... H04J 14/02 398/38 |

\* cited by examiner

VARIATION-TOLERANT WAVELENGTH DIVISION MULTIPLEXING RECEIVER AND TRANSCEIVER, AND ASSOCIATED METHODS

CROSS-REFERENCE TO RELATED APPLICATIONS

This application claims the benefit of priority of U.S. Patent Application Ser. No. 61/898,358, filed 31 Oct. 2013, which is incorporated herein by reference in its entirety.

U.S. GOVERNMENT RIGHTS

This invention was made with government support under grant numbers CCF0829950 and IIP-1342641 awarded by the National Science Foundation. The Government has certain rights in the invention.

BACKGROUND

Optical transceivers mass produced using integrated circuit techniques are adversely affected by process variation and inter-chip thermal drift of component optical properties. Process variation is a random process appearing as a random walk when, for example, devices near each other (on the same wafer) have similar characteristics but devices located some distance away (on the same or on a different wafer) have notably different characteristics.

Continuously increasing demand for telecommunications bandwidth has driven development of optical fiber systems that include optical transmitters and receivers. These optical devices are implemented in smaller and smaller systems, including data communications, inter-chip optical interconnections in information processing systems, and even intra-chip optical interconnections in multicore optical processors. The need for miniaturization of transceivers is an overriding issue, and is typically addressed through monolithic component integration.

Optical wavelength division multiplexing (WDM) allows for increased carrying capacity of optical fibers and other optical waveguides. This increase is achieved by employing a number of channels widely spaced (in wavelength) such that optical filters perform channel separation. Such filters may be employed in the optical domain before detection and optical-to-electrical signal conversion.

Temperature variations challenge WDM processes within integrated optical components and the narrow-band laser sources coupled thereto. For example, in an integrated optical component including four modulators each receiving an optical signal from a different laser, temperature variation alters the source laser wavelength which in turn degrades performance of the integrated optical component. Laser athermalization techniques have attempted to mitigate this but only at the great expense of increased cost, power and size.

SUMMARY OF THE INVENTION

In an embodiment, a variation-tolerant receiver includes a plurality of receiver resonators configured to demultiplex a multiplexed modulated signal received from a remotely-located wavelength division multiplexing (WDM) transmitter having a plurality of transmitter resonators. Each of the receiver resonators has a receiver resonance linewidth not exceeding a minimum spacing between two adjacent transmitter resonances. All receiver resonances collectively span a free spectral range of one of the receiver resonators such that the variation-tolerant receiver achieves gapless spectral response.

In an embodiment, a variation-tolerant WDM transceiver includes a plurality of transmitter resonators, each of the transmitter resonators having a transmitter resonance; and a plurality of receiver resonators, each of the receiver resonators having a receiver resonance linewidth not exceeding a minimum spacing between two adjacent transmitter resonances. The receiver resonances collectively span a free spectral range of one receiver resonator such that the variation-tolerant receiver achieves gapless spectral response.

In an embodiment, a variation-tolerant WDM transceiver includes a plurality of transmitter resonators, each of said transmitter resonators having a transmitter resonance; and a plurality of receiver resonators. Each of said receiver resonators having perimeter, shape, cross-sectional dimensions, and bulk refractive index such that operationally (a) each receiver resonance linewidth does not exceed a minimum spacing between two adjacent transmitter resonances and (b) the receiver resonances collectively span a free spectral range of one receiver resonator to achieve gapless spectral response.

In an embodiment, a variation-tolerant WDM transceiver includes a plurality of transmitter resonators, each of said transmitter resonators having a transmitter resonance; and a plurality of receiver resonators. Each of said receiver resonators having perimeter, shape, cross-sectional dimensions, and bulk refractive index such that operationally (a) each receiver resonance linewidth does not exceed a minimum spacing between two adjacent transmitter resonances and (b) the receiver resonances collectively span a free spectral range of one receiver resonator to achieve gapless spectral response.

In an embodiment, a method for passively compensating transmitter-receiver channel mismatch in a transceiver includes the steps of: separating a broadband carrier into a plurality of narrowband transmitter carriers; modulating the narrowband transmitter carriers to form a plurality of modulated signals; multiplexing each of the modulated signals to form a multiplexed modulated signal; demultiplexing the multiplexed modulated signal to form a plurality of receiver signals, each receiver signal having a spectral width not exceeding a minimum spectral spacing between two adjacent transmitter carriers; and reconstructing the plurality of modulated signals from the plurality of receiver signals.

In an embodiment, a method for variation-tolerant signal reconstruction is disclosed includes steps of receiving a multiplexed modulated signal, having a first center carrier wavelength, on one or more receiver channels of a plurality of receiver channels each having one of a respective plurality of center carrier wavelengths. The receiver channels that receive the modulated signal have a receiver center carrier wavelength closer to the first carrier wavelength than any other receiver center carrier wavelength. In an embodiment, the method reconstructs the multiplexed modulated signal received by the one or more receiver channels.

DETAILED DESCRIPTION

In accord with certain teachings hereinbelow, optical transceiver compactness and low power may be achieved through use of partially coherent sources for transmitting information. Such sources include amplified spontaneous emission sources, light emitting diodes (LEDs) or LED variants such as super luminescent LEDs (SLEDs). Certain present day SLEDs have sufficient power (per nanometer of transmitted bandwidth for transmitter channel spacing of one to a few nanometers) to produce more than a milliwatt per nanometer. LEDs will also soon satisfy such specifications. Thus there is no need for laser coherence in order to parse out many transmitter channels of sufficient power to satisfy WDM for data communications, inter-chip and/or intra-chip interconnection.

The use of wideband partially coherent sources is also advantageous in that source thermal drift causes drift of each carrier wavelength corresponding to a respective transmitter channel. Ring modulators with information and guard bands allow a transmitter to operate equally well in the presence of thermal drift if the guard band is wide enough or if extra channels are opened on either side of the passband. That is, drift may be accommodated by allowing the set of transmitted channels to vary with time.

A problem may arise at the receiver if process variation and thermal drift at the receiver does not match variation at a distant transmitter (that is, a transmitter located far away from the receiver or on another chip entirely). This problem is mitigated through process-variation-aware design; that is, according to the teachings herein, the receiver may be designed to have a wider bandwidth than that of the transmitter by having the number of receiver channels exceed the number of transmitter channels, wherein a minimum inter-channel spectral spacing between two adjacent transmitter channels equals or exceeds a maximum spectral width of any receiver channel. Drift or process variation then merely causes the received signal to be captured by a different set of channels.

The embodiments disclosed herein generally relate to the transmission of information and more specifically to the transmission of information over multiple wavelength division multiplexed (WDM) channels using integrated optical transceivers for link initiation, termination and repetition. Knowledge of system requirements issued with network designs allows for production of variation-tolerant optoelectronic circuits that are resistant to process variation and drift and are suitable for monolithic integration.

Figure 1:
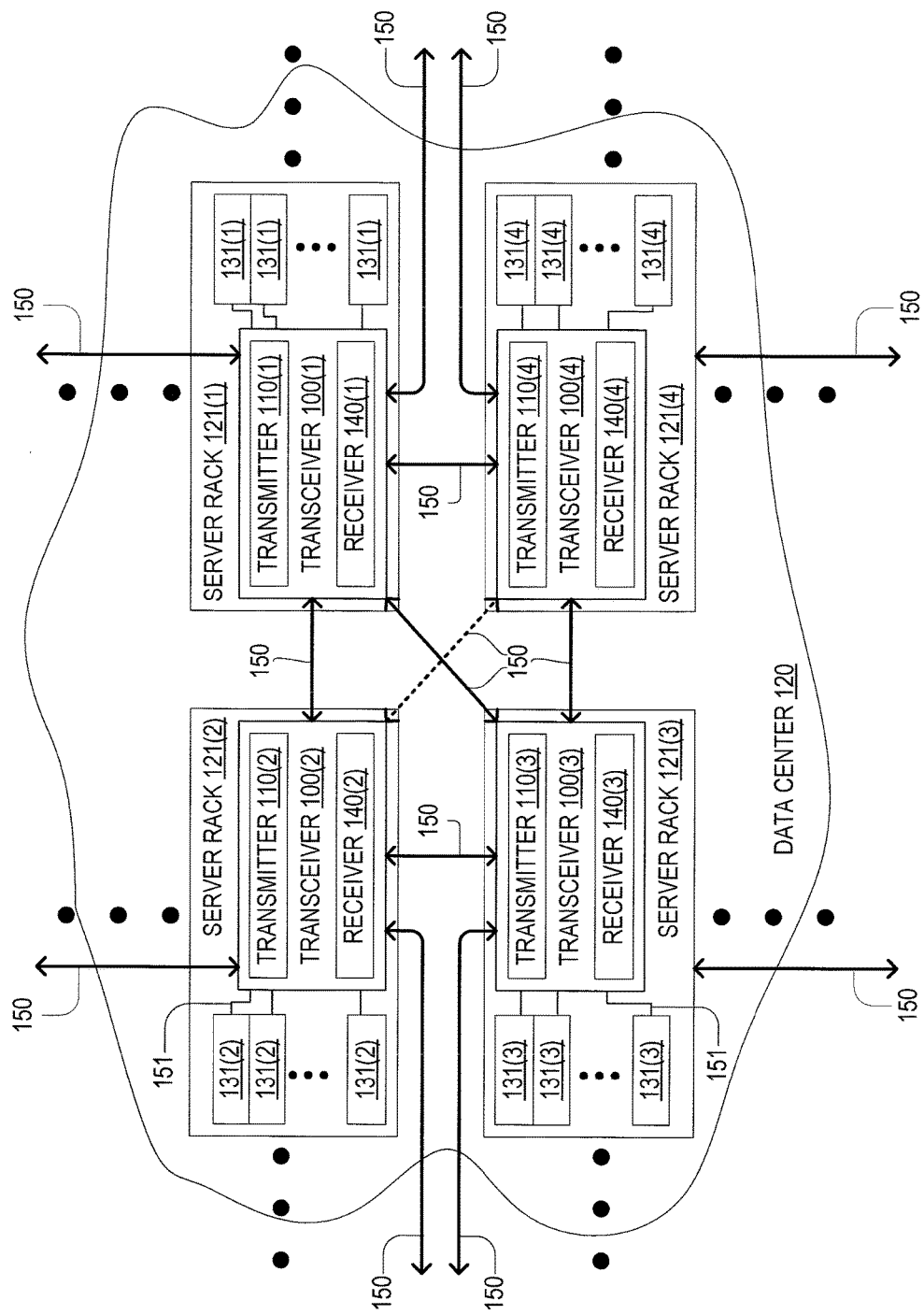
FIG. 1 illustrates operational use of a variation-tolerant WDM transceiver, in an embodiment.

FIG. 1 shows a portion of a data center 120 that illustratively includes four identical variation-tolerant WDM transceivers 100(1), 100(2), 100(3), 100(4) each within an associated server rack 121(1-4). Each server rack 121(1-4) includes a respective plurality of servers 131(1-4) that are each communicatively connected to a respective variation-tolerant WDM transceiver 100(1-4) via an interconnect 151, which may be optical or electrical. Data center 120 may have fewer or more than four variation-tolerant WDM transceivers 100, and associated server racks 121, without departing from the scope hereof.

Each variation-tolerant WDM transceiver 100 has an associated transmitter 110 to send multiplexed modulated signals 150 to each other variation-tolerant WDM transceiver 100; and each variation-tolerant WDM transceiver 100 has an associated receiver 140 to receive multiplexed modulated signals 150 from each other variation-tolerant WDM transceiver 100. Variation-tolerant WDM transceiver 100(1) may generate a multiplexed modulated signal 150 that propagate via an Ethernet switch located on server rack 121(1) to other variation-tolerant WDM transceivers 100 located on other respective server racks 121 that each also include an Ethernet switch.

Figure 2:
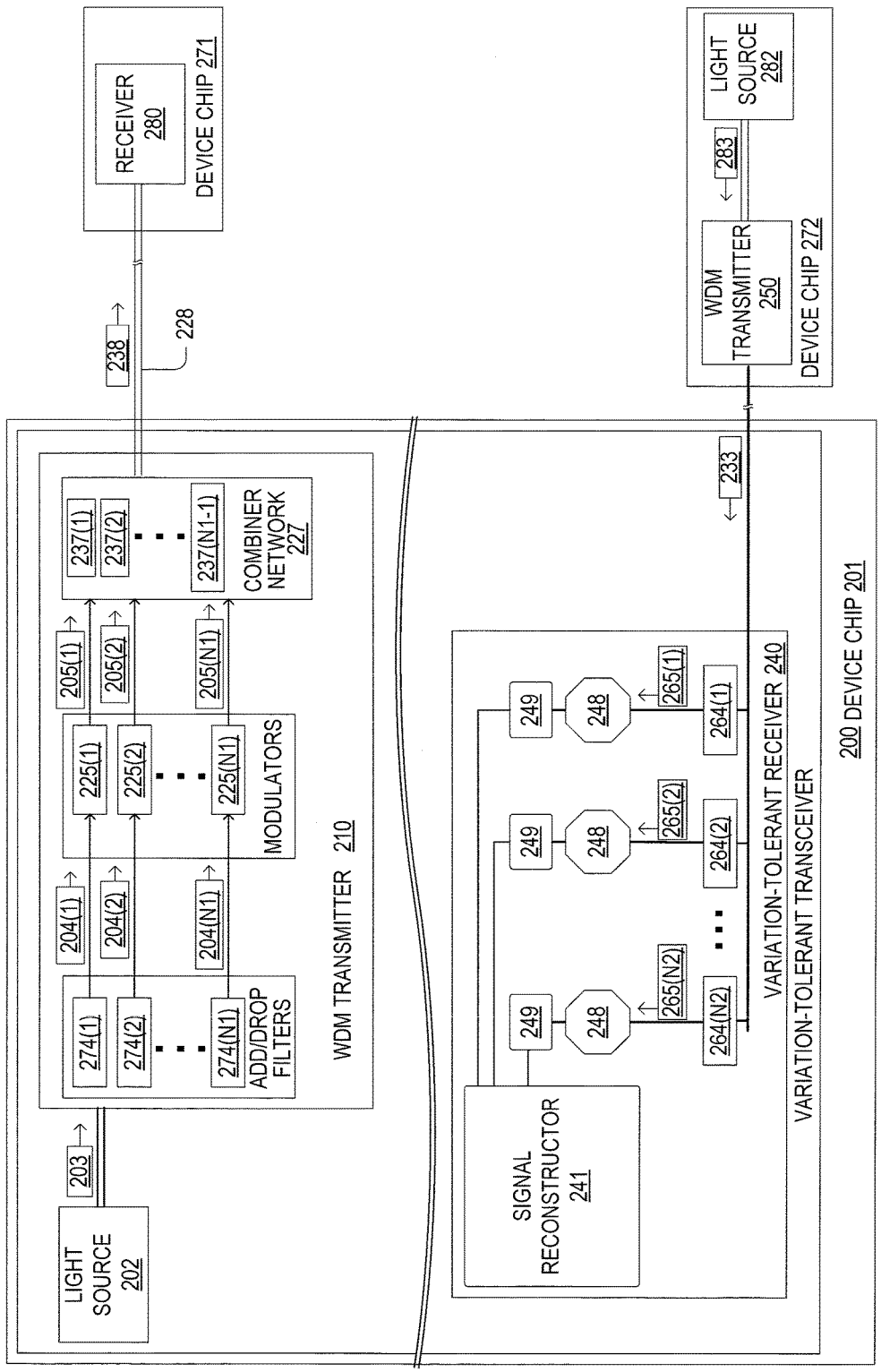
FIG. 2 is a schematic diagram of a variation-tolerant WDM transceiver on a device chip, in an embodiment.

FIG. 2 is a schematic diagram of a variation-tolerant WDM transceiver 200 on a device chip 201. Variation-tolerant WDM transceiver 200 is an embodiment of variation-tolerant WDM transceiver 100 of FIG. 1, and includes a WDM transmitter 210 and a variation-tolerant receiver 240 (WDM transmitter 210 and variation-tolerant receiver 240 are similarly embodiments, respectively, of transmitter 110 and receiver 140, FIG. 1.) In operation, WDM transmitter 210 receives a broadband carrier 203 generated by a broadband light source 202, which is part of variation-tolerant WDM transceiver 200. Broadband light source 202 is, for example, a commercially-available super luminescent diode (SLED). WDM transmitter 210 outputs a multiplexed modulated signal 238 that may be sent to a variation-tolerant receiver 280 on a device chip 271. WDM transmitter 210 and variation-tolerant receiver 280 are on different device chips, which means they are "remotely located" from each other.

Variation-tolerant receiver 240 on device chip 201 is similar to variation-tolerant receiver 280 on device chip 201. Just as variation-tolerant receiver 280 receives multiplexed modulated signal 238 from WDM transmitter 210, variation-tolerant receiver 240 receives a multiplexed modulated signal 233 from a WDM transmitter 250 on a device chip 272. WDM transmitter 250 receives a broadband optical signal 283 generated by a broadband light source 282. As before, WDM transmitter 250 and variation-tolerant receiver 280 are on different device chips, meaning they too are remotely located from each other. WDM transmitter 250 is similar to WDM transmitter 210.

By way of analogy, in FIG. 1, variation-tolerant WDM transceivers 100(1) and 100(2) are remotely located from each other and multiplexed modulated signals 150 are similarly transmitted from transmitter 110(1) to receiver 140(2) across different server racks 121.

In the embodiment of FIG. 2, WDM transmitter 210 includes N1 add/drop filters 274, N1 modulators 225, and combiner network 227 wherein N1 is a positive integer greater than or equal to three. Combiner network 227 includes a quantity (N1-1) two-to-one combiners 237. Each add/drop filter 274 may include one or more of a ring resonator and a racetrack resonator, for example. All optical components of variation-tolerant WDM transceiver 200 may be silicon-on-insulator (SOI) photonic devices operating in one or more of the following wavelengths ranges: 1260-1360 nm (O-band), 1360-1460 nm (E-band), 1460-1530 nm (S-band) and 1530-1565 nm (L-band). In an embodiment, variation-tolerant WDM transceiver 200 includes devices operable at visible electromagnetic wavelengths, such as SOI devices that guide light through doped silicon, for example $Si_3N_4$ and other $Si_xNi_y$ chemical compounds. Variation-tolerant WDM transceiver 200 may include silicon-on-sapphire devices, for example, those operating at mid-infrared wavelengths, without departing from the scope hereof.

Modulator 225 is for example an interferometric optical modulator, such as a Mach-Zehnder interferometer (MZI) modulator. Examples of MZI modulators include those described in the ISIPP25G Library Documentation (Release 1.0, www.epixfab.eu/technologies/isipp25g) published by Imec, and references to MZI modulators in "Integrated Silicon Nanophotonic Data Processing Devices: A Brief Review," *Recent Patents on Signal Processing*, 2013, 3, 42-48, by Zalevsky, and "Silicon Photonics: A Review," *IOSR Journal of Applied Physics*, 3, 5, 67-79, by Dhiman.

A single ring-resonator modulator may include the function of one add/drop filter 274 and one modulator 225. Thus, each of one or pairs of add/drop filter 274 and modulator 225 may be implemented as a ring-resonator modulator. Examples of ring-resonator modulators include those described in "Optical modulation and detection in slotted Silicon waveguides" by Baehr-Jones et al (*Optics Express*, 13, 14, pp. 5216-5226 (2005)), and references thereto. Combiners 237 may include a multi-mode interference (MMI) combiner, such as multi-mode interference (MMI) combiner combiner_MMI2x1_M_1550_TE described in the ISIPP25G Library Documentation. Detailed specifications of the above-mentioned modulators and combiners are available to those skilled in the art from Luceda Photonics (Dendermonde, Belgium) and its IPKISS software.

Each add/drop filter 274 outputs a respective narrowband transmitter carrier 204 that is modulated by a respective modulator 225. Modulator 225 outputs a respective modulated signal 205 that is combined by combiner network 227 that outputs multiplexed modulated signal 238 to a variation-tolerant receiver 280.

Variation-tolerant receiver 240 includes N2 add/drop filters 264, where N2 exceeds N1. Each add/drop filter 264 outputs a respective receiver signal 265, each with a respective carrier wavelength, which is received by a respective photodetector 248. Photodetector 248 is, for example, implemented as discussed in the aforementioned review article by Dhiman. Each photodetector 248 may be electrically connected to a respective amplifier 249. Amplifier 249 is for example a transimpedance amplifier. Variation-tolerant receiver 240 may lack amplifiers 249 without departing from the scope hereof. In an embodiment of variation-tolerant receiver 240, one photodetector 248 receives the output of two or more add/drop filters 264, for example, those with adjacent resonances that may overlap the same transmitter channel.

Variation-tolerant receiver also includes a signal reconstructor 241 that receives the output of each of N2 amplifiers 249. Alternatively, signal reconstructor 241 may receive the output of each of N2 photodetectors 248. Signal reconstructor 241 receives N2 inputs from each add/drop filter 264 and generates N1 outputs corresponding to the number of transmitted channels of WDM transmitter 250. For example, if N1=4 and N2=16, signal reconstructor 241 reconstructs four signals from the sixteen input signals it receives. In one example, each signal transmitted by add/drop filters 274(1), 274(2), 274(3), and 274(4) is received by two adjacent receiver add/drop filters: 264(4, 5), 264(8,9), 264(12,13), and 264(14,15), and all other receiver add/drop filters have negligible signal. Signal reconstructor 241 detects which receiver add/drop filters 264 have a signal, and sums the signals from add/drop filters 264 that have adjacent carrier wavelength.

Figure 3:
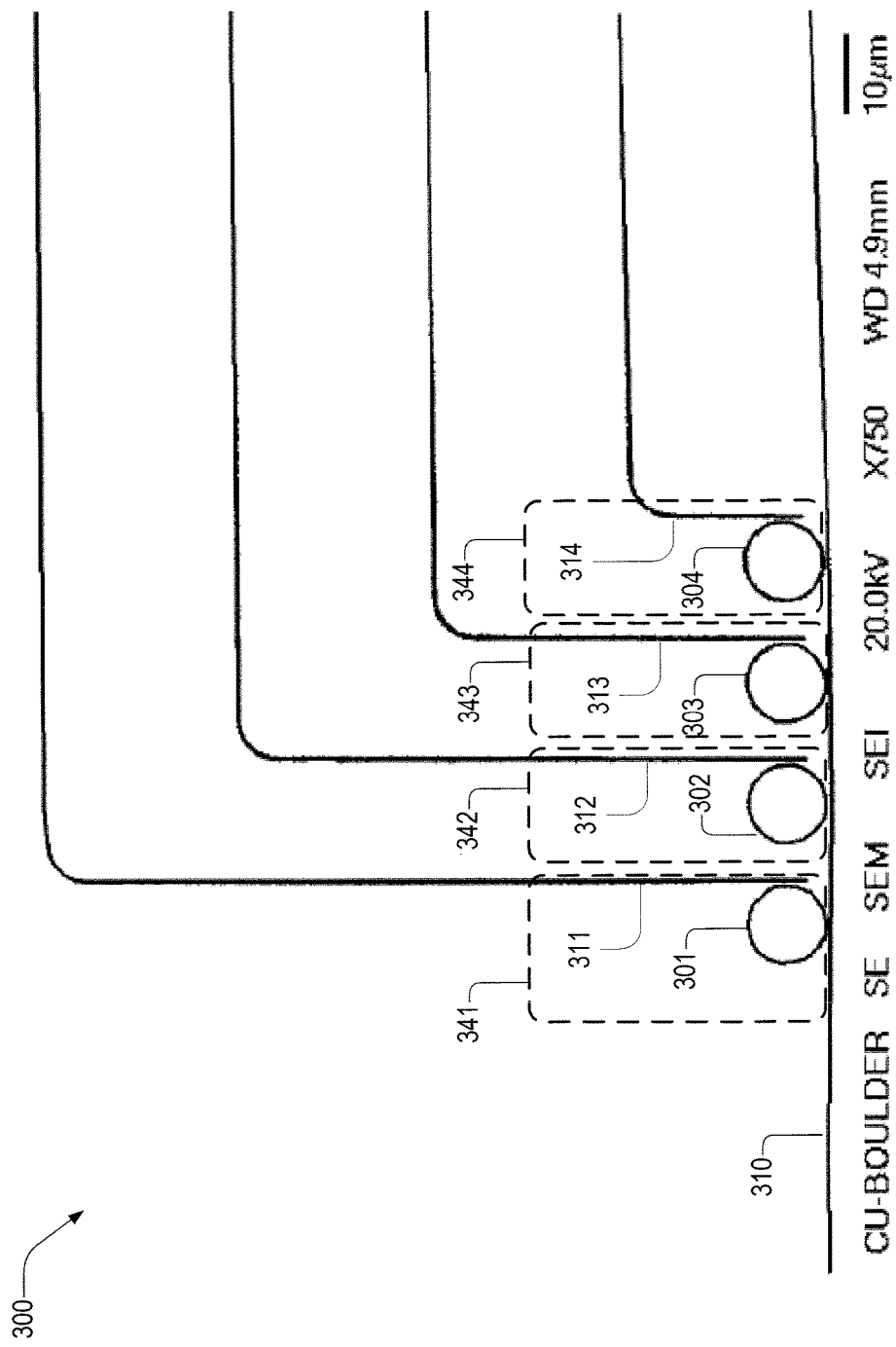
FIG. 3 shows an exemplary WDM device that includes add/drop filters, which are embodiments of the add/drop filters of FIG. 2.
Figure 4:
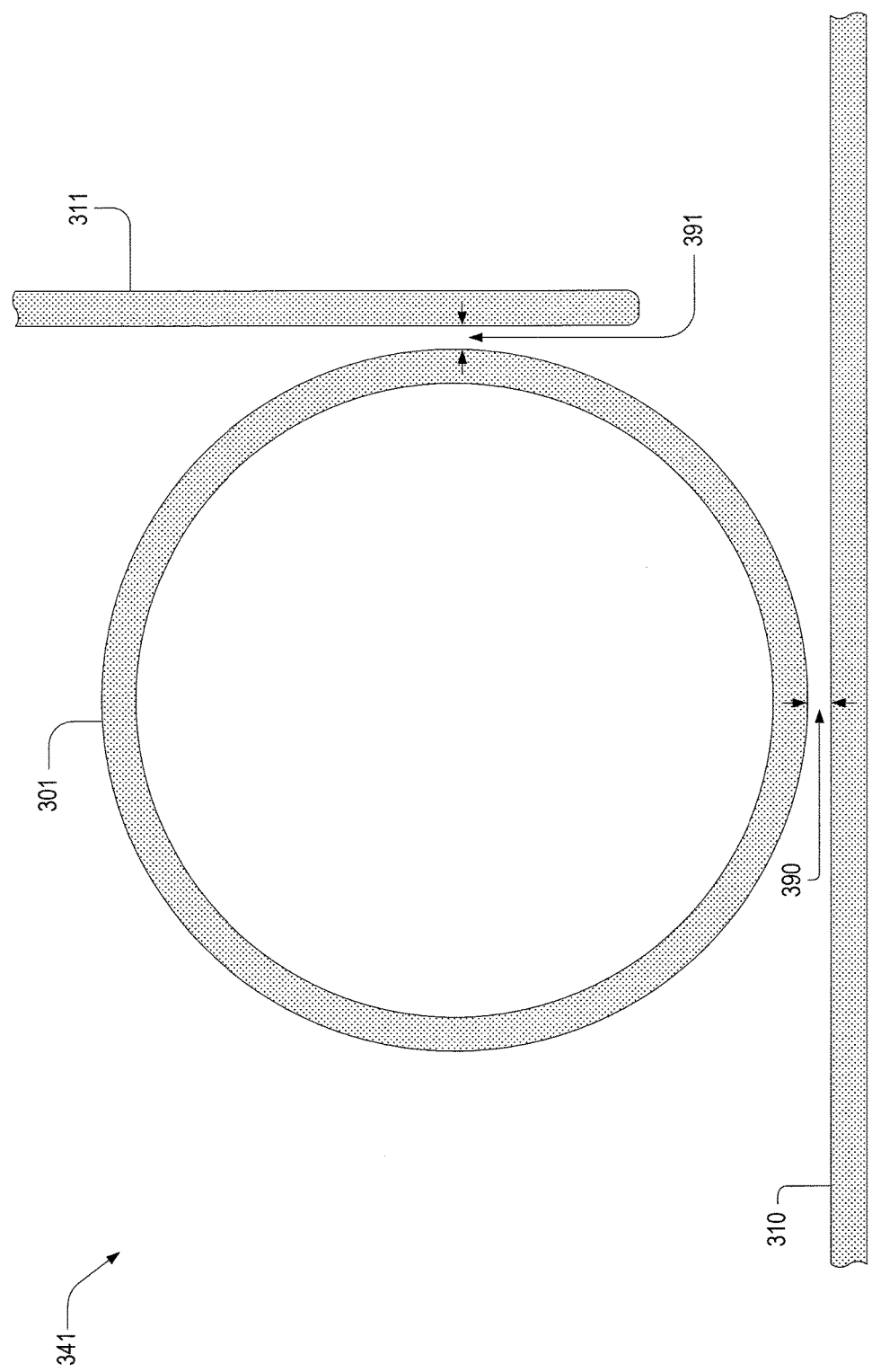
FIG. 4 is a schematic plan view of an add/drop filter of FIG. 3.

FIG. 3 is a processed scanning electron microscope (SEM) micrograph of a four-resonator WDM device 300 that includes add/drop filters 341-344, which are embodiments of add/drop filters 274 and 264 of FIG. 2. Add/drop filters 341-344 are part of a WDM device (e.g., WDM transmitter 210, FIG. 2) which also includes a feed waveguide 310. Each add/drop filter 341-344 includes a respective microring resonator 301-304, each having slightly differing radius. Each add/drop filter 341-344 also includes a drop waveguide 311-314, respectively. FIG. 4 is a schematic plan view of add/drop filter 341. FIGS. 3 and 4 are best viewed together in the following discussion.

Four-resonator WDM device 300 is identical to the silicon-on-insulator photonic device shown in figure seven of "Process variation in silicon photonic devices," *Applied Optics*, 52, 31 (2013) by Chen, Mohamed, Li, Shang, and Mickelson, hereafter referred to as "Chen (2013)." An input coupling gap 390 is the shortest distance between feed waveguide 310 and each microring resonator 301-304. An output coupling gap 391 is the shortest distance between each microring resonator 301-304 and its respective drop waveguide 311-314. The width of coupling gaps 390 and 391 are 200 nm for each resonator. The radii of microring resonators 301, 302, 303, and 304 are 4.975, 4.995, 5.015, and 5.035 micrometers, respectively. In this embodiment, feed waveguide 310, microring resonators 301-304, and drop waveguide 311-314 have cross-sectional dimensions of 450 nm (width) and 220 nm (height). Dimensions of coupling gaps 390 and 390 and radii microring resonators 301-304 may vary from the above-stated values without departing from the scope hereof. In an embodiment of variation-tolerant WDM transceiver 200, waveguide cross-sections are constrained in both cross-sectional dimensions to support a single mode. Microring resonators 301-304, feed waveguide 310, and drop waveguides 311-314 are for example formed of silicon.

Microring resonators 301, 302, 303, and 304 have resonance wavelengths $\lambda_m$ determined by Eq. 1, as described in Chen (2013) and references therein.

$$m\lambda_m = L_{cir} n_{eff}(\lambda_m) \tag{1}$$

In Eq. 1, m is the mode number, $L_{cir}$ is the microring circumference, and $n_{eff}(\lambda_m)$ is effective refractive index (mode index) at wavelength $\lambda_m$. The free-spectral range (FSR) of a microring resonator is the difference between adjacent resonances, for example, $\lambda_m$ and $\lambda_{m+1}$, and is a function of $L_{cir}$, $\lambda_m$, and the group refractive index $n_g = n_{eff} - \lambda \partial n_{eff}/\partial \lambda$. Chapter 2 of *Integrated Ring Resonators*, Springer Series in Optical Sciences, Vol. 127 (2007), edited by D. Rabus provides an expression for FSR, Eq. 2:

$$FSR = \frac{\lambda_0^2}{n_g L_{cir}} \quad (2)$$

The effective refractive index may be computed numerically with a mode solver, such as Comsol Multiphysics® or other finite-element electromagnetics modeling codes. The refractive index may also be found with a combination of analytical and numerical modeling, as described in "Parameter extraction from fabricated silicon photonic devices," *Applied Optics*, 53, 7 (2014) by Chen, Li, Mohamed, Shang, and Mickelson. Other satisfactory methods for determining the refractive index of a micro-ring resonator mode include those described in "Silicon microring resonators," Laser Photonics Rev., 6, 1, 47-73 (2012) by Bogaerts et al, and "Universal relations for coupling of optical power between microresonators and dielectric waveguides," *Electronics Letters*, 36, 4 (2002), by A. Yariv.

The resonance linewidth of a microring resonator is a function of resonance wavelength $\lambda_0$, a coupling parameter $\kappa$ that depends primarily on the radius of the microring resonator, ring circumference $L_{cir}$, and effective index $n_{eff}(\lambda_0)$ at the resonance wavelength. As provided by Rabus, an expression for full-width at half-maximum (FWHM) resonance linewidth is shown in Eq. 3:

$$FWHM = 2\delta\lambda = \frac{\kappa^2 \lambda_0^2}{\pi L_{cir} n_{eff}} \quad (3)$$

For a given ring radius $r_1$, coupling parameter $\kappa(r_1)$ can be determined phenomenologically by solving Eq. 3 for $\kappa$ and using one more measured values of FWHM (at different wavelengths, for example) for a microring having radius $r_1$. Effective index $n_{eff}(\lambda_0)$ depends on the bulk refractive index of the microring and its cross-sectional dimensions (width and height). Data on bulk refractive index can be found in *Handbook of Optical Constants of Solids*, edited by Palik. For example, a measured value of the refractive index of crystalline silicon at $\lambda_0 = 1.532$ μm is $n=3.4784+10^{-4}$ i.

In an embodiment, the radii of microring resonators 301, 302, 303, and 304 are chosen such that the resonance wavelengths $\lambda_m$ satisfy three conditions. The first condition is that, for a given mode number m, the range of resonance wavelengths $\lambda_m$ of microring resonator 301-304 (max($\lambda_m$) − min($\lambda_m$)) is less than the FSR of any microring resonator 301-304. The second condition is that, for a given mode number m, there is a sufficiently-wide intra-mode guard band between adjacent resonances of microring resonators 301-304: resonance wavelength $\lambda_m$ of each microring resonator 301-304 must be sufficiently separated such that a resonance of a microring, having a linewidth $\delta\lambda$, does not overlap with a resonance of a different microring. An intra-mode guard band has a width $\Delta\lambda - \delta\lambda$, where $\Delta\lambda$ is the difference between the center-to-center spacing of adjacent resonances and $\delta\lambda$ is the resonance linewidth.

The third condition on resonance wavelengths $\lambda_m$ concerns process variation related to silicon-on-insulator photonic devices, where resonance wavelengths of two identically-designed resonators depend on spatial separation on the fabrication wafer. Chen (2013) concludes that for microring resonators such as resonators 301-304, the change in resonance wavelength due to process variation is approximately $(\Delta\lambda_{pv})^2 = 1.3$ nm$^2$/cm. For example, two identically-designed microring resonators structures separated by nine centimeters may have resonance wavelengths that differ by $\Delta\lambda_{pv} = 3 \cdot (1.3)^{1/2}$ nm = 3.4 nm. The thermal drift $\Delta\lambda_T$ of microring resonator wavelengths is less than 0.1 nm/° C. The third condition specifies that adjacent rings are sufficiently close together such that $\Delta\lambda_{pv}$ is significantly less than the guard band, having a width $\Delta\lambda - \delta\lambda$. The quantity $\Delta\lambda_{pv}$ is an exemplary "characteristic spectral shift" of transmitter resonance resulting from process variation inherent in fabricating a variation-tolerant WDM transceiver 200 and WDM transmitter 210, and variation-tolerant receiver 240. The value of $\Delta\lambda_{pv}$ may vary, to correspond to a specific fabrication process for example, without departing from the scope hereof.

Figure 5:
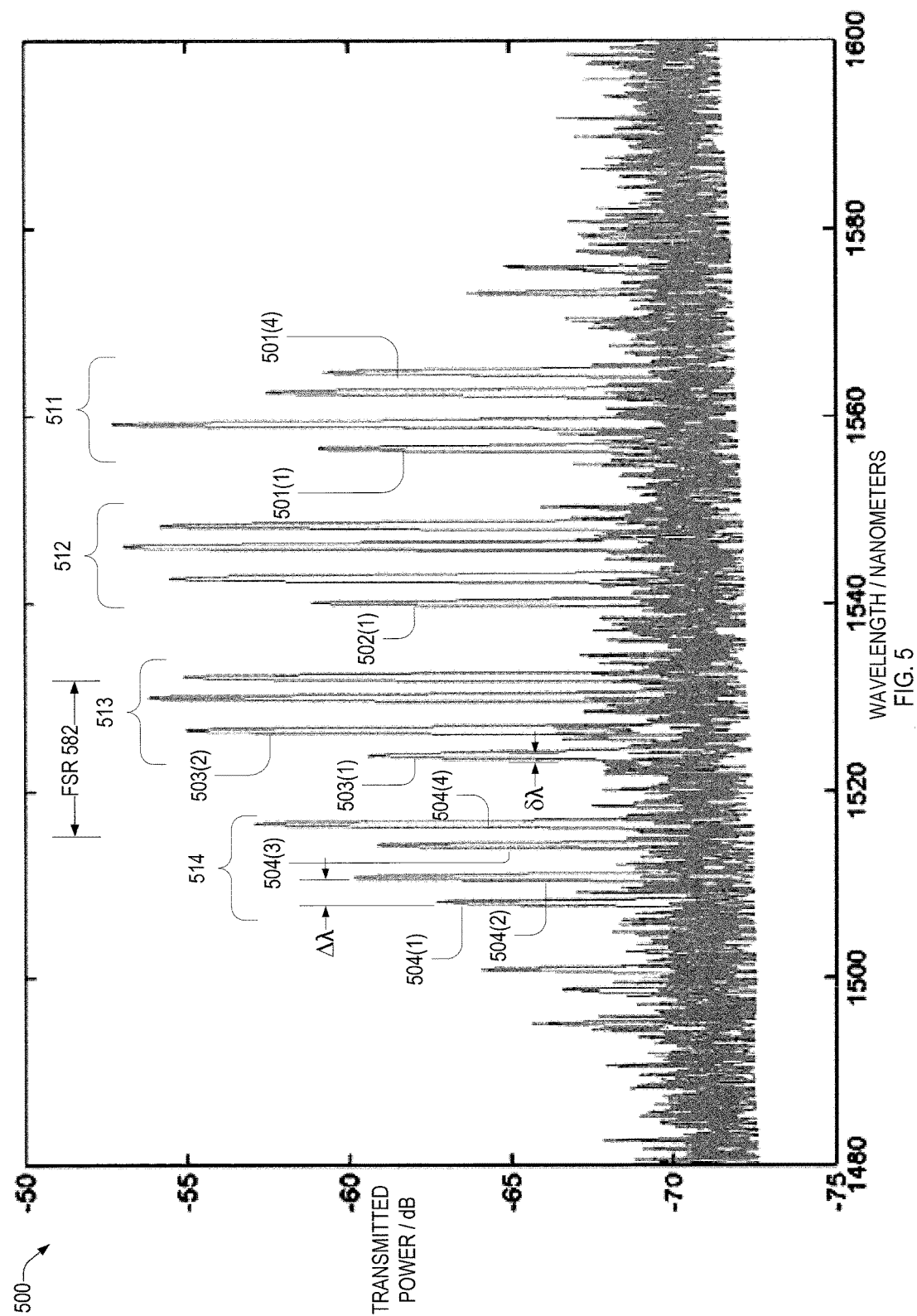
FIG. 5 shows an exemplary measured output spectrum for a silicon photonic circuit that includes a WDM device similar to the WDM device of FIG. 3.

FIG. 5 shows an exemplary measured output spectrum 500 of a silicon photonic circuit that includes a WDM device similar to four-resonator WDM device 300, FIG. 3. Output spectrum 500 includes four complete channel groups 511-514 mutually spaced by a free spectral range (FSR) 582. Herein, a "complete channel group" of a device including $N_g$ add/drop filters is a group of $N_g$ adjacent channels, of a transmission spectrum or detected spectrum for example.

Each complete channel group 511-514 includes four channels that correspond to resonances of microring resonators 301-304 at a respective mode. For example, complete channel group 514 includes channels 504(1), 504(2), 504(3), and 504(4) that correspond to a resonance of microring resonators 301, 302, 303, 304, respectively, at an identical mode number m. Complete channel groups 511, 512, and 513 include respective channels 501(1-4), 502(1-4), and 503(1-4), wherein each of channels 501(1-4), 502(1-4), and 503(1-4) corresponds to a resonance of microring resonators 301-304 at mode numbers m+1, m, and m−1 respectively. Alternatively, a complete channel group may include adjacent channels corresponding to different mode numbers. For example, a complete channel group of four-resonator WDM device 300 may consist of channels 504(3), 504(4), 503(1), and 503(2).

The resonance linewidth of each microring resonator 301-304 is $\delta\lambda \leq 1$ nm and the center-to-center spacings are $\Delta\lambda \approx 2$ nm, which implies that guard-band width $(\Delta\lambda - \delta\lambda) \approx 1$ nm. Herein, "resonance linewidth" and "spectral linewidth" refer to a FWHM value.

Figure 6:
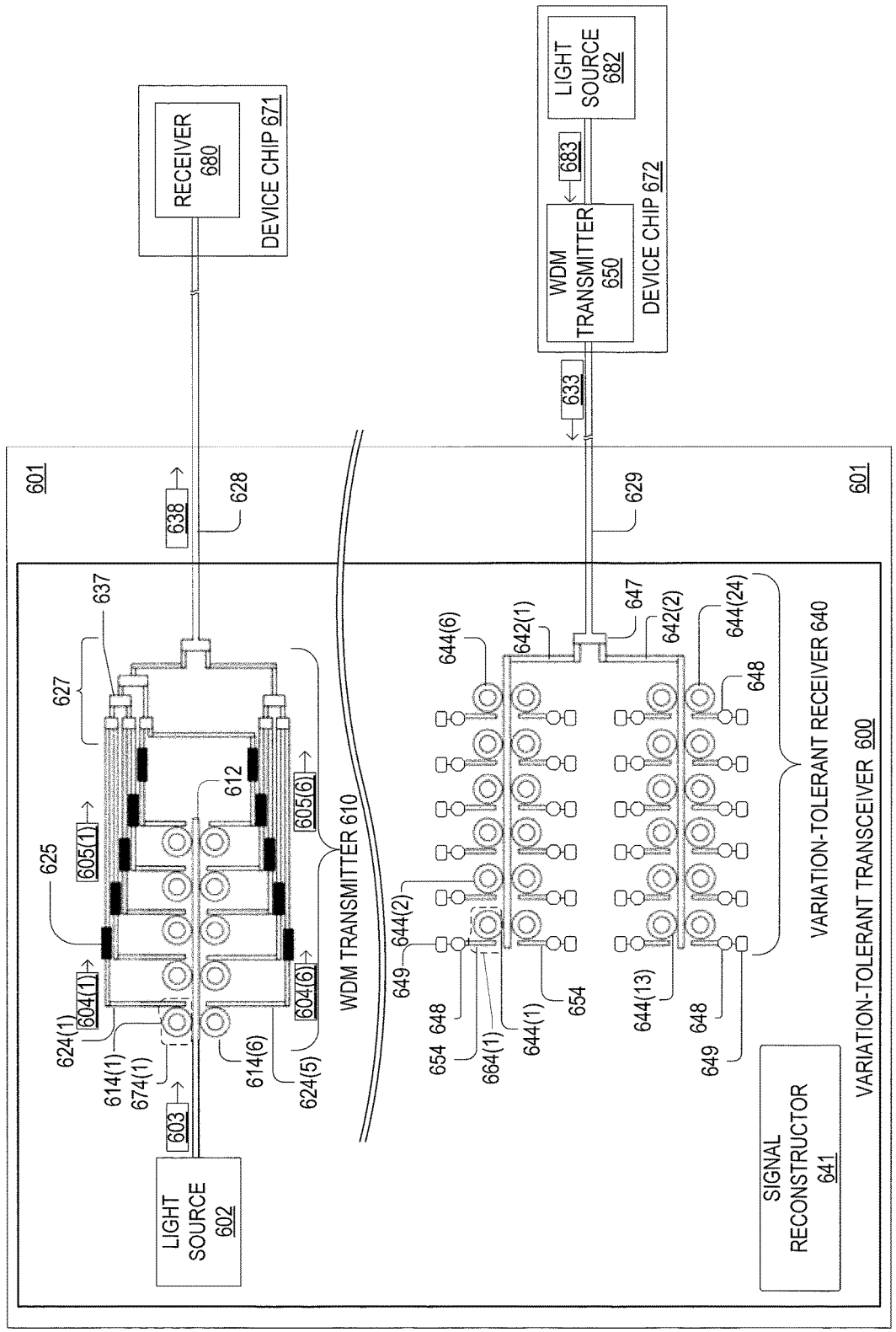
FIG. 6 is a schematic depiction of a variation-tolerant WDM transceiver, in an embodiment.

FIG. 6 is a schematic depiction of a variation-tolerant WDM transceiver 600 on a device chip 601. Variation-tolerant WDM transceiver 600 is an embodiment of variation-tolerant WDM transceiver 200, and includes a broadband light source 602, a WDM transmitter 610, and a variation-tolerant receiver 640. WDM transmitter 610 receives a broadband carrier 603 generated by broadband light source 602. Broadband light source 602 is similar to broadband light source 202, FIG. 2.

WDM transmitter 610 includes ten add/drop filters 674 (1-10) that include a respective transmitter resonator 614(1-10) within coupling distance to a feed waveguide 612. WDM transmitter 610 can be viewed as a pair of five-resonator WDM devices (similar to four-resonator WDM device 300) with common feed waveguide 612 and with an associated input coupling gap similar to input coupling gap 390. A transmitter resonator 614 is, for example, a microring resonator or a racetrack resonator. In an embodiment, the resonance wavelengths of transmitter resonators 614(1-10) satisfy the three conditions on resonance wavelengths described in relation to four-resonator WDM device 300.

Each transmitter resonator 614(1-10) has an associated drop waveguide 624(1-10) and an associated output coupling gap therebetween that is similar to output coupling gap 391. Each drop waveguide 624 receives a respective narrowband carrier 604(1-10) from its associated transmitter resonator 614. In an embodiment, each drop waveguide 624 is optically coupled to a modulator 625 that imparts a signal on each narrowband carrier 604. Modulators 625 are similar to modulators 225, FIG. 2.

Each modulator 625(1-10) transmits a respective modulated signal 605(1-10). A combiner network 627 combines modulated signals 605 into a multiplexed modulated signal 638 that propagates over an external link 628 to a variation-tolerant receiver 680 on a device chip 671. Combiner network 627 is similar to combiner network 227, and includes a plurality of combiners 637 that are similar to combiners 237. Variation-tolerant receiver 680 is similar to variation-tolerant receiver 640.

Variation-tolerant receiver 640 receives a multiplexed modulated signal 633 generated by a WDM transmitter 650 on a device chip 672 via an external link 629. WDM transmitter 650 is similar to WDM transmitter 610. WDM transmitter 650 receives a broadband carrier 683 from a broadband light source 682. Broadband carrier 683 and a broadband light source 682 are similar to broadband carrier 603 and broadband light source 602. WDM transmitter 610 may generate multiplexed modulated signal 633 received by variation-tolerant receiver 640 without departing from the scope hereof.

In the forgoing discussion, WDM transmitter 650 is considered to be similar to WDM transmitter 610. Specifically, the transmitter resonators, input coupling gap, and output coupling gap of WDM transmitter 650 are identical to and referred to as transmitter resonators 614, input coupling gap 390, and output coupling gap 391 respectively, and will be referred to as such. Variation-tolerant receiver 640 may receive multiplexed modulated signal 633 from a WDM transmitter with transmitter resonators and coupling gaps that differ from that of WDM transmitter 610 without departing from the scope hereof.

Variation-tolerant receiver 640 includes twenty-four add/drop filters 664(1-24), which are embodiments of add/drop filter 264. Each add/drop filter 664(1-24) includes a receiver resonator 644(1-24) and a drop waveguide 654. A receiver resonator 644 may be, for example, a microring resonator or a racetrack resonator. Variation-tolerant receiver 640 also includes a signal reconstructor 641, which is an embodiment of signal reconstructor 241.

Referring again to multiplexed modulated signal 633, a 1×2 splitter 647 divides multiplexed modulated signal 633 onto feed waveguides 642(1) and 642(2), which function as feed waveguides to receiver resonator 644(1-12) and receiver resonator 644(13-24) respectively. For clarity of illustration, not all receiver resonators are labeled in FIG. 6. Feed waveguides 642(1) and 642(2) are separated from their associated microring resonators by an input coupling gap of width similar to input coupling gap 390. Each drop waveguide 654 has an associated output coupling gap similar to input coupling gap 391, FIG. 3.

The output of each add/drop filter 664 is coupled, via a corresponding drop waveguide 654, to a respective photodetector 648. Each photodetector 648 is electrically connected to a respective amplifier 649. Amplifier 649 is for example a transimpedance amplifier. In an embodiment of variation-tolerant receiver 640, a photodetector 648 receives the output of two or more add/drop filters 664, for example, those with adjacent resonances that may overlap the same transmitter channel.

Figure 7:
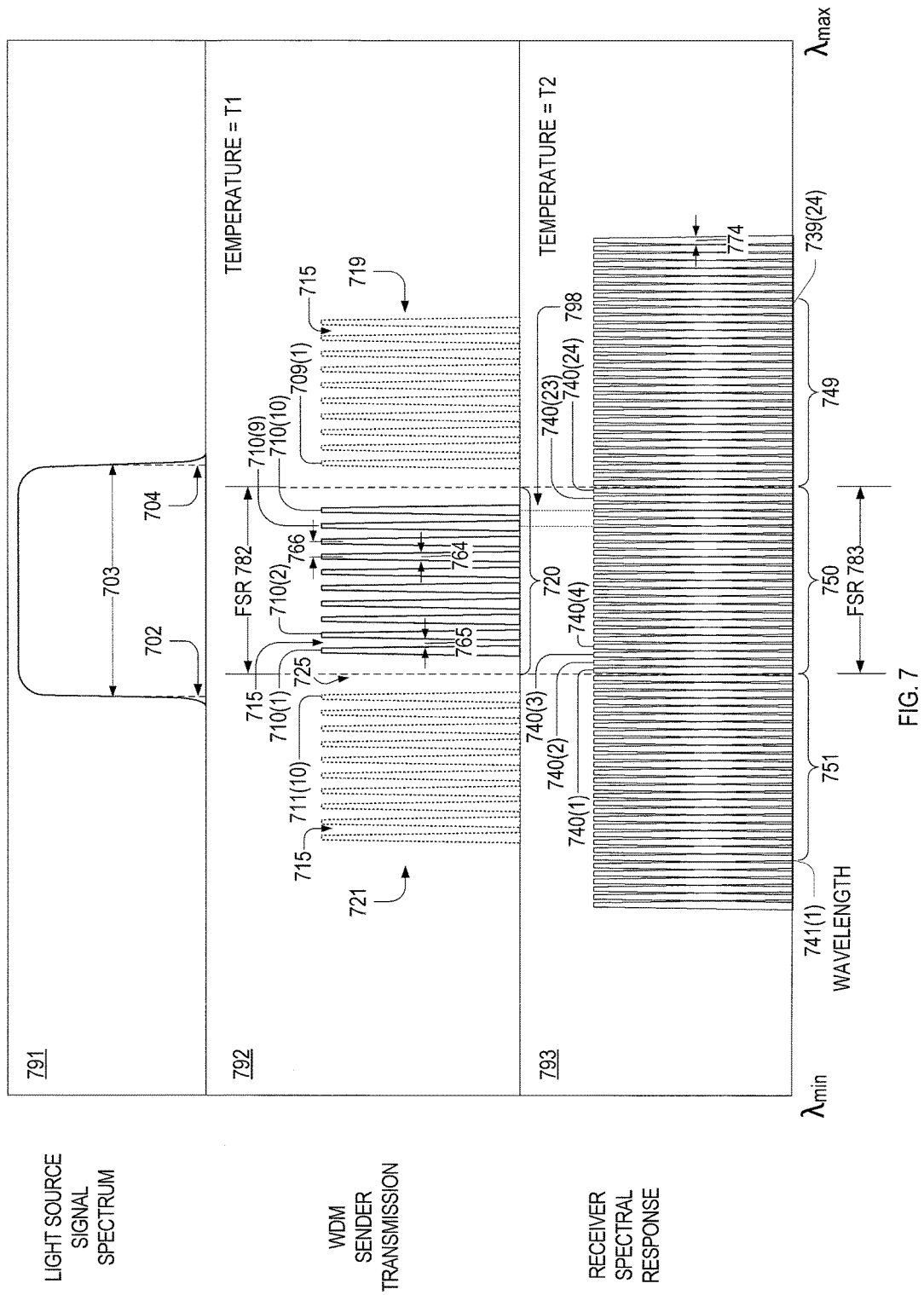
FIG. 7 includes a schematic broadband carrier spectrum, a schematic transmission spectrum, and a schematic receiver spectral response of the broadband optical signal, WDM transmitter, and variation-tolerant receiver, respectively, of FIG. 6.

FIG. 7 includes a schematic broadband carrier spectrum 791, a schematic transmission spectrum 792, and a schematic receiver spectral response 793 of broadband carrier 603, WDM transmitter 650, and variation-tolerant receiver 640, respectively, as a function of wavelength. The wavelength range of FIG. 7 is between $\lambda_{min}$ and $\lambda_{max}$, which are for example 1480 nm and 1600 nm respectively, as in FIG. 5. FIGS. 6 and 7 are best viewed together in the following discussion.

Transmission spectrum 792 is an exemplary transmission spectrum of WDM transmitter 650 at a temperature T1 when illuminated by broadband carrier 683 from broadband light source 682, FIG. 6. Broadband carrier 683 has a FWHM source bandwidth 703 between a minimum wavelength 702 and a maximum wavelength 704. Transmission spectrum 792 includes complete channel group 720, which consists of transmitter channels 710(1-10). At temperature T1, each transmitter channel 710(1-10) has a wavelength corresponding to a resonance of a transmitter resonator 614(1-10) that is between minimum wavelength 702 and maximum wavelength 704.

Complete channel groups 719 and 721 correspond to other resonance frequencies of transmitter resonators 614 that are outside of source bandwidth 703. Complete channel groups 719 and 721 consist of transmitter channels 709(1-10) and 711(1-10) respectively.

In a first embodiment, transmitter channels 710(1-10) correspond to a resonance of a respective transmitter resonators 614(1-10) at a mode m. In this embodiment, transmitter channels 709(1-10) correspond to a resonance of a respective transmitter resonators 614(1-10) at a mode m−1, and transmitter channels 711(1-10) correspond to a resonance of a respective transmitter resonators 614(1-10) at a mode m+1. In a second embodiment, a transmitter channel 710(1) corresponds to a first mode number, while transmitted channel 710(10) corresponds to a second mode number not equal to the first mode number. The same applies to transmitter channels 709 and 711. For sake of simplifying discussion, the first embodiment above applies hereinafter.

Transmission spectrum 792 corresponds to WDM transmitter 650 at temperature T1 in which only transmitter channels 710 are within source bandwidth 703. Source bandwidth 703 exceeds an FSR 782 of a transmitter resonator 614. Each transmitter resonator 614 has a respective transmitter-resonator FSR. In an embodiment, FSR 782 corresponds to the largest of the transmitter-resonator FSRs, such that source bandwidth 703 exceeds an FSR of each transmitter resonator 614.

At a temperature exceeding T1, resonances of transmitter resonators 614 may drift to longer wavelengths such that wavelengths corresponding to one or more of transmitter channels 711 and 710 are between minimum wavelength 702 and maximum wavelength 704, resulting in a transmission spectrum of WDM transmitter 650 that includes one or more of transmitter channels 711 and 710. An inter-mode guard band 725 separates both transmitted channels 711(1) and 710(1) and transmitted channels 710(10) and 709(1).

Transmitter channels 710 have a minimum inter-channel spacing 766 between any two adjacent transmitter channels 710, such as transmitter channels 710(1) and 710(2). Inter-channel spacing 766 is the spectral width between center carrier wavelengths of adjacent transmitter channels. Guard bands, such as an intra-mode guard band 715, are between adjacent transmitter channels 709, adjacent transmitter channels 710, and adjacent transmitter channels 711. Each transmitted channel 710, transmitted channel 710(1) for example, has two adjacent guard bands 715 and 725. Guard band 715 has a smaller adjacent guard-band width 765 (i.e., it is a narrower adjacent guard-band of a given transmission channel). In an embodiment of WDM transmitter 610, each smaller adjacent guard-band width 765 equals to or exceeds a transmitted-channel spectral width 764 of its adjacent transmitter channel 710.

Transmitted-channel spectral width 764 is for example $\delta\lambda \leq 1$ nm, similar to the resonance linewidth of each microring resonator 301-304, FIG. 3. Smaller adjacent guard-band width 765 is for example approximately 1 nm, which is the approximate value of the intra-mode guard-band width ($\Delta\lambda - \delta\lambda$) of FIG. 3.

For transmitter channels 710 of transmitter resonators 614 (of WDM transmitter 650) to include guard-banded channels of sufficient bandwidth, as shown in FIG. 7, transmitter resonators 614 must be positioned sufficiently close together on device chip 601 such that the process variation $\Delta\lambda_{pv}$ is less than the difference in the resonators' resonance wavelengths (predicted by Eq. 1). As discussed in Chen (2013), between at least 25° C. and 50° C., multiple resonance wavelengths of transmitter resonators 614 (represented by transmitter channels 710), increase linearly, and at the same slope, as temperature increases. Herein, temperature changes and variation refer to temperatures between approximately 25° C. and 50° C.

Variation-tolerant receiver 640 has receiver spectral response 793 to a spectrally flat broadband source with a spectral bandwidth exceeding both bandwidth 703 and three times FSR 782. Receiver spectral response 793 may be measured by coupling the spectrally flat broadband were directly into an external link 628 and combining the spectral responses of photodetectors 648.

Within source bandwidth 703 of broadband light source 602, receiver spectral response 793 includes complete channel groups 749, 750, and 751 each having twenty-four channels 739(1-24), 740(1-24), and 741(1-24), respectively. For clarity of illustration, not all of channels 739(1-24), 740(1 24), and 741(1 24) are labeled in FIG. 7. Each receiver channel 739, 740, and 741 has a spectral width 774 not exceeding minimum inter-channel spacing 766 between two adjacent transmitter channels 710.

Receiver spectral response 793 exceeds zero at all wavelengths within source bandwidth 703 of broadband light source 602. Receiver spectral response 793 may be viewed as a gapless comb of receiver channels 739, 740, and 741, which collectively span at least source bandwidth 703 of broadband light source 602. In FIG. 7, receiver channels 739, 740, and 741 span a bandwidth that exceeds three times the bandwidth of FSR 782.

In receiver spectral response 793, the minimum value of receiver spectral response, located between each channel, is approximately one-half the maximum response of each channel. Herein, a receiver spectral response of a variation-tolerant receiver, variation-tolerant receiver 640 for example, may be considered gapless if its minimum response between receive channels is at least half the maximum response at the center of a channel. The gapless nature of receiver spectral response means that regardless of wavelength drift of transmitter resonators 614 resulting from temperature or process variation, guarantees that receiver channel 740 of variation-tolerant receiver 640 (one of receiver channels 739(1-24), 740(1-24), 741(1-24), for example) will receive it.

In a first embodiment of variation-tolerant WDM transceiver 600, each receiver channel 739(1-24), 740(1-24), and 741(1-24) correspond to receiver mode numbers $m_r-1$, $m_r$, and $m_r+1$, respectively of receiver resonators 644. In an embodiment, receiver mode number $m_r$ of receiver channels 740 equals that of a sender mode number $m_s$ associated with transmitter channels 710 of transmitter resonators 614. In a second embodiment of variation-tolerant WDM transceiver 600, at least one of receiver channels 740 corresponds to more than one mode number of receiver resonators 644. For example, receiver channel 740(24) may correspond to a mode number $m_r$, while channel 740(1) corresponds to mode number $m_r+1$. For sake of simplifying discussion, the first embodiment above applies hereinafter.

Receiver channels 740(1-24) span an FSR 783 of a receiver resonator 644, which is necessary for part variation-tolerant receiver 640 to demultiplex multiplexed modulated signal 633 regardless of channel displacement caused by one or more of process variation and thermal drift. In FIG. 7, FSR 783 equals FSR 782. FSR 783 may exceed FSR 782 or be less than FSR 782 without departing from the scope hereof.

FIG. 7 represents a case where one or both of process variation and thermal drift have displaced channels of multiplexed modulated signal 633 by a half-channel spacing from receiver channels 740, as illustrated by dotted vertical lines 798. Variation-tolerant receiver 640 captures each channel 710 of multiplexed modulated signal 633, except now by a set of channels displaced by a half of a grid spacing from it.

For example, FIG. 7 shows receiver channels 744(3) and 744(4) spectrally overlapping with and receiving transmitter channel 710(1). A relative temperature change between WDM transmitter 650 and variation-tolerant receiver 640 may shift channels 710 and 740 relative to each other such that, for example, receiver channels 744(1) and 744(2) overlap with and receive transmitted channel 710(1). A different relative temperature change may result in transmitter channels 710 being received by a combination of receiver channels 739 and 740, or 740 and 741.

As illustrated by receiver spectral response 793, variation-tolerant receiver 640 has two key properties: (1) each receiver resonator 644 of variation-tolerant receiver 640 overlaps a center of at most one transmitter channel 710 from WDM transmitter 650, and (2) variation-tolerant receiver 640 demultiplexes each transmitted channel 710 from WDM transmitter 650 onto a respective receiver channel 740, regardless of temperature variation.

Variation-tolerant receiver 640 satisfies property (1) because the linewidth of each receiver resonator 644 does not exceed a minimum spacing between two adjacent resonances. That is, each receiver channel 739, 740, and 741 has a spectral width 774 not exceeding minimum inter-channel spacing 766 between two adjacent transmitter channels 710. If property (1) is not satisfied, a receiver resonator 644 would have a linewidth that is wide enough to span the peak of two adjacent two transmitted channels. This may occur, for example, if the center wavelength of a receiver channel 740 corresponded to a wavelength halfway between adjacent transmitter channels.

Variation-tolerant receiver 640 is able to satisfy property (2) because the receiver resonance linewidths of receiver resonators 644, represented by receiver channels 740(1-24), collectively span FSR 783 of one of the receiver resonators. This spanning results from the number of receiver resonators 644 being at least the quotient of a receiver resonator FSR and the smallest receiver channel linewidth. If receiver resonators 644 vary only in optical path length therein, their resonances all have an equal linewidth, and this minimum number of receiver resonators 644 is approximately equal to finesse of a receiver resonator 644.

For clarity of illustration, not all transmitter resonators 614, drop waveguides 624, modulators 625, combiners 637, photodetectors 648, amplifiers 649, transmitter channels 709-711, and receiver channels 740 are labelled in FIGS. 6 and 7.

Figure 8:
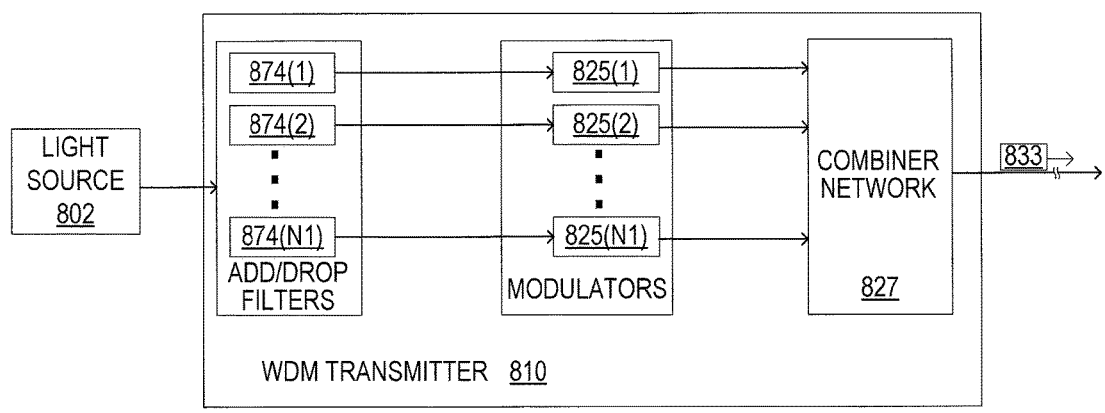
FIG. 8 is a schematic diagram of a WDM transmitter, in an embodiment.

FIG. 8 is a schematic diagram of a WDM transmitter 810 optically coupled to a light source 802. WDM transmitter 810 is an embodiment of WDM transmitter 210, and includes add/drop filters 874, modulators 825, and a combiner network 827. Light source 802, add/drop filters 874, modulators 825, and combiner network 827 are similarly embodiments of broadband light source 202, add/drop filters 274, modulators 225, and combiner network 227, respectively, of WDM transmitter 210. WDM transmitter 810 outputs a multiplexed modulated signal 833.

Figure 9:
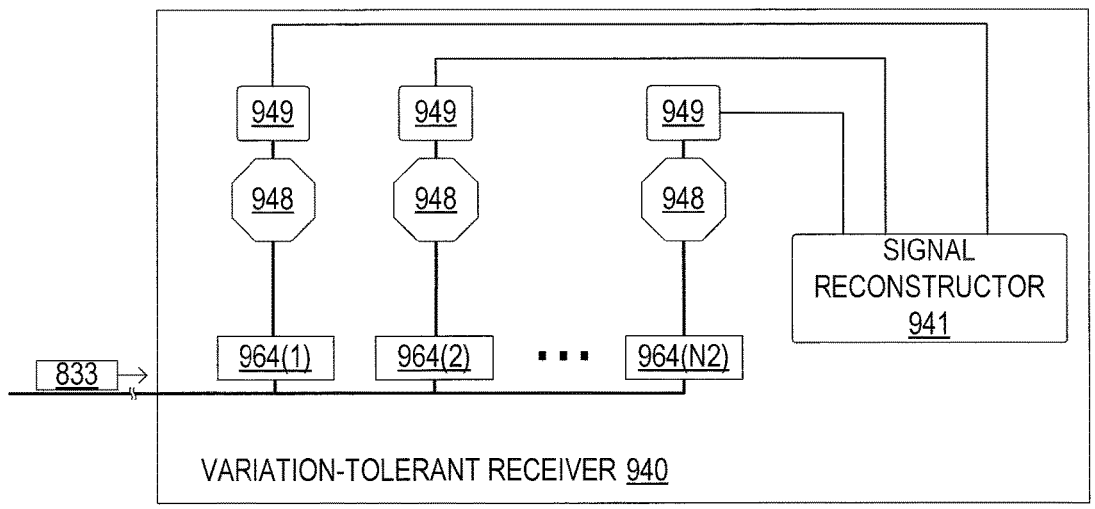
FIG. 9 is a schematic diagram of a variation-tolerant receiver configured to demultiplex a multiplexed modulated signal received from the WDM transmitter of FIG. 8, in an embodiment.

FIG. 9 is a schematic diagram of a variation-tolerant receiver 940 configured to demultiplex multiplexed modulated signal 833 received from WDM transmitter 810. Variation-tolerant receiver 940 is an embodiment of variation-tolerant receiver 240, and includes add/drop filters 964, photodetectors 948, amplifiers 949, and a signal reconstructor 941. Add/drop filters 964, photodetectors 948, and amplifiers 949 are similarly embodiments of add/drop filters 264, photodetectors 248, amplifiers 249, and signal reconstructor 241, respectively, of variation-tolerant receiver 240. FIGS. 8 and 9 are best viewed together in the following discussion.

Add/drop filters 874 of WDM transmitter 810 and add/drop filters 964 of variation-tolerant receiver 940 are similar to add/drop filters 341-344 of FIG. 3, which include respective microring resonators 301-304, drop waveguides 311-314, and a common feed waveguide 310. The cross-sectional dimensions of each feed waveguide, microring resonator, and drop waveguide of add/drop filters 874 and 964 are the same as in add/drop filters 341-344: 450 nm (width) and 220 nm (height). The gaps between each microring resonator and its respective feed waveguide and drop waveguide is 200 nm. Each feed waveguide, microring resonator, and drop waveguide of add/drop filters 874 and 964 are formed of silicon.

Figure 10:
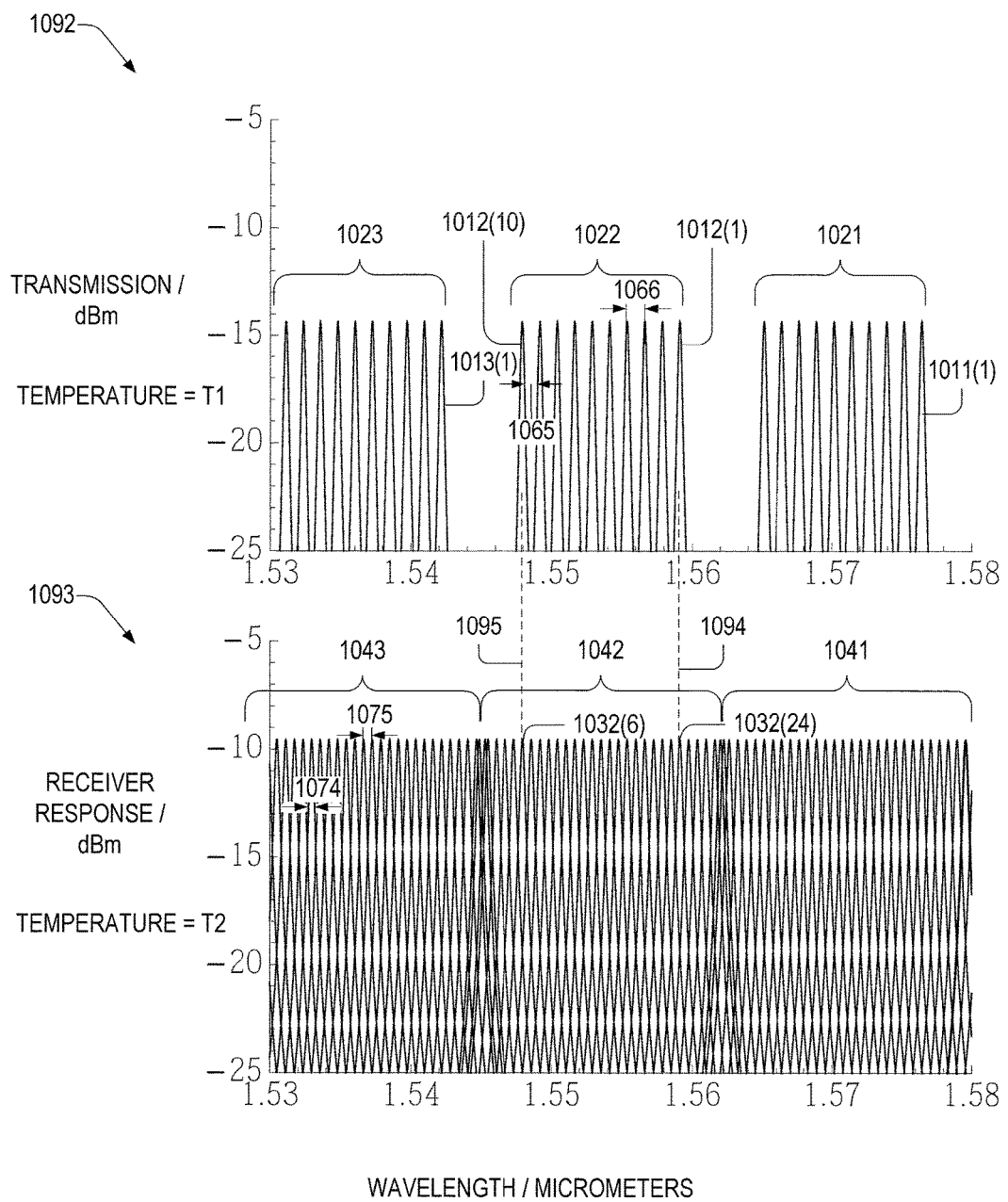
FIG. 10 shows a predicted transmission spectrum of the WDM transmitter of FIG. 8, in an embodiment, and a detected spectrum of the variation-tolerant receiver of FIG. 9, in an embodiment.

FIG. 10 shows a predicted transmission spectrum 1092 of a first embodiment of WDM transmitter 810 and a predicted receiver spectral response 1093 of a first embodiment of variation-tolerant receiver 940. The first embodiment of WDM transmitter 810 includes N1=ten microring resonators of add/drop filters 874 with respective radii ranging from 4.982 μm to 5.018 μm in 4-nm increments. The first embodiment of variation-tolerant receiver 940 includes N2=twenty-nine microring resonators of add/drop filters 964 with respective radii ranging from 4.972 μm to 5.028 μm in 2-nm increments. Since WDM transmitter 810 and variation-tolerant receiver 940 have an equal average ring radius (5.000 μm), the respective average FSRs of WDM sender 810 and variation-tolerant receiver 940 are equal.

Add/drop filters 874 of WDM transmitter 810 and add/drop filters 964 of variation-tolerant receiver 940 differ only in the radii of their respective microring resonators. Consequently, each resonance linewidth of WDM transmitter 810 is equal, and is equal to the resonance linewidth of variation-tolerant receiver 940. Of the twenty-nine radius values of respective microring resonators of variation-tolerant receiver 940, ten of them match the ten radius values of respective microring resonators of WDM transmitter 810.

Transmission spectrum 1092 and predicted spectral response 1093 are based on Eq. 1, Eq. 3, and a finite-element model to compute $n_{eff}(\lambda_0)$ based on a bulk refractive index value of silicon.

Transmission spectrum 1092 includes three complete channel groups 1021, 1022, 1023. In this case, each complete channel group 1021, 1022, and 1023 corresponds to a respective mode $m_{810}-1$, $m_{810}$, $m_{810}+1$ of add/drop filters 874. For example, channels 1011(1), 1012(1), and 1013(1) are consecutive modes $m_{810}-1$, $m_{810}$, $m_{810}+1$ of a same add/drop filter 874 that has the largest microring radius, 5.018 μm. Complete channel groups 1021, 1022, 1023 include transmission channels 1011(1-10), 1012(1-10), and 1013(1-10), respectively.

Receiver spectral response 1093 includes three complete channel groups 1041, 1042, 1043. (Part of complete channel group 1043 extends to wavelengths less than 1530 nm, not shown in FIG. 10.) In this case, each complete channel group 1041, 1042, and 1043 corresponds to the same respective modes as complete channel groups 1021, 1022, and 1023: $m_{810}-1$, $m_{810}$, $m_{810}+1$. Complete channel group includes twenty-nine receiver channels including 1032(6) and 1032(24). Each complete channel group 1041-1043 spans an FSR of at least one add/drop filter 964 of variation-tolerant receiver 940.

In a most general case, transmission spectrum 1092 corresponds to a temperature T1 of WDM transmitter 810 and receiver spectral response 1093 corresponds to a temperature T2 of variation-tolerant receiver 940. Vertical lines 1094 and 1095 extending from transmitted channels 1012(1) and 1012(10) to receiver channels 1032(6) and 1032(24) illustrate that a receiver channel 1032 is aligned with each transmitter channel 1012. This suggests that T1=T2, or that the difference between T1 and T2 results in a wavelength drift equal to one more (integer) transmission channel spacings 1075 of receiver spectral response 1093.

Each channel of transmission spectrum 1092 and receiver spectral response 1093 has a FWHM spectral width $\delta v$=0.4 nm. Each pair of adjacent transmission channels within complete channel groups 1021-1023 have a center-to-center spacing $\Delta v$=1.2 nm. The width 1065 of a guard band between each adjacent transmission channel pair is $(\Delta v - \delta v)$=0.8 nm.

Transmitter channels 1011-1013 have a minimum inter-channel spacing 1066 ($\Delta v$=1.2 nm) between any two adjacent transmitter channels 1011-1013. Each receiver channel shown in detected spectral response 1093, such as receiver channels 1032(6) and 1032(24) has a spectral width 1074 ($\delta v$=0.4 nm) not exceeding minimum inter-channel spacing 1066.

Receiver channels 1032 correspond to a respective resonance of add/drop filters 964 and span an FSR of at least one add/drop filter 964 of variation-tolerant receiver 940. Resonances of add/drop filters 964 thus collectively span a free spectral range of one add/drop filter 964 such that the variation-tolerant receiver 940 achieves gapless spectral response.

Figure 11:
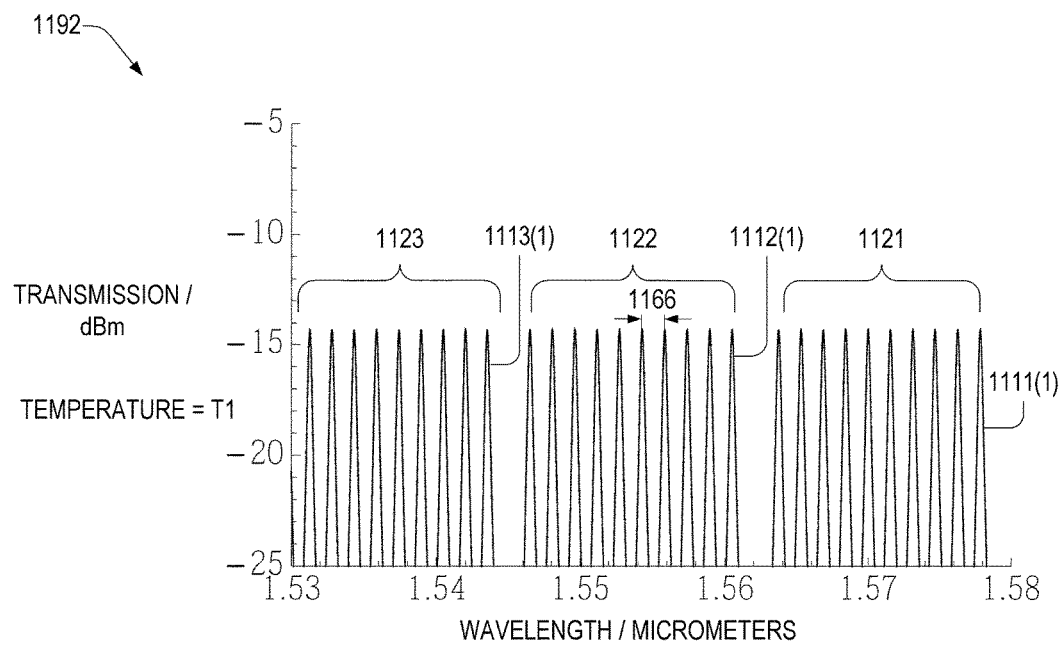
FIG. 11 shows a predicted transmission spectrum of a second embodiment of the WDM transmitter of FIG. 8, in an embodiment.

FIG. 11 shows a predicted transmission spectrum 1192 of a second embodiment of WDM transmitter 810. The second embodiment of WDM transmitter 810 is the same as the first embodiment of WDM transmitter 810 (with transmission spectrum 1092), except for the radii of microring resonators. The second embodiment of WDM transmitter 810 includes N1=ten microring resonators of add/drop filters 874 with respective radii ranging from 4.9925 μm to 5.0375 μm in 5-nm increments. Transmission spectrum 1192 includes three complete channel groups 1121, 1122, 1123 that are analogous to complete channel groups 1021, 1022, 1023, respectively. Complete channel groups 1121, 1122, 1123 include transmission channels 1111(1-10), 1112(1-10), and 1113(1-10), respectively.

Each channel of transmission spectrum 1192 and receiver spectral response 1093 has a FWHM spectral width δv=0.4 nm. Each pair of adjacent transmission channels within complete channel groups 1121-1123 have a center-to-center spacing Δv=1.6 nm. The width 1065 of a guard band between each adjacent transmission channel pair is (Δv−δv)=1.2 nm.

Transmitter channels 1111-1113 have a minimum inter-channel spacing 1166 (Δv=1.6 nm) between any two adjacent transmitter channels 1111-1113. Each receiver channel shown in detected spectral response 1093, such as receiver channels 1032(6) and 1032(24) has a spectral width 1074 (δv=0.4 nm) not exceeding minimum inter-channel spacing 1166.

Figure 12:
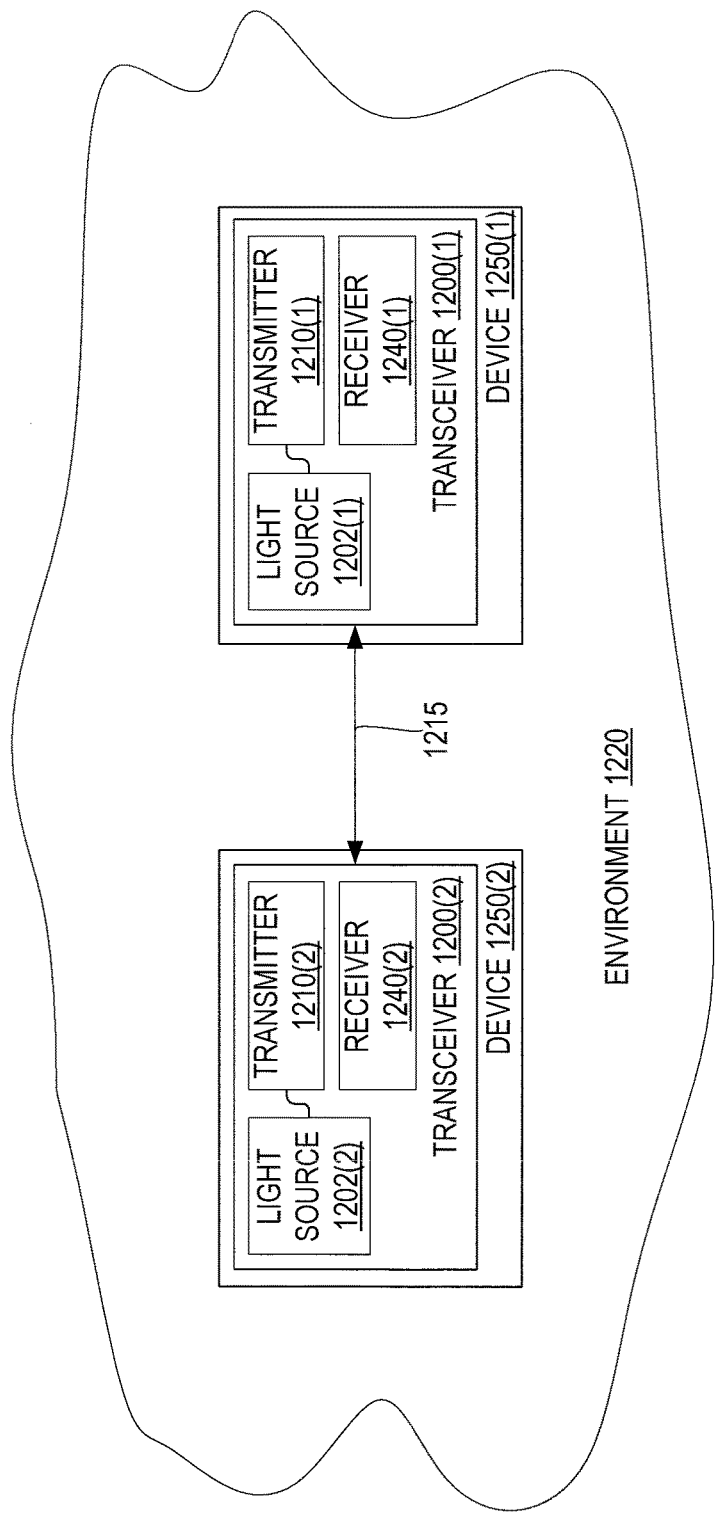
FIG. 12 shows an operational environment including two identical variation-tolerant WDM transceivers each associated with a respective device, in an embodiment.

FIG. 12 shows an environment 1220 that illustratively includes two identical variation-tolerant WDM transceivers 1200(1) and 1200(2) each associated with a respective device 1250(1) and 1250 (2). Environment 1220 may have fewer or more than two variation-tolerant WDM transceivers 1200 and associated devices 1250, without departing from the scope hereof.

Each variation-tolerant WDM transceiver 1200 has an associated WDM transmitter 1210 that multiplexes a broadband signal from a broadband light source 1202 and sends optical signals 1215 to each other variation-tolerant WDM transceiver 1200. Each variation-tolerant WDM transceiver 1200 has an associated receiver 1240 to receive optical signals 1215 from each other variation-tolerant WDM transceiver.

Variation-tolerant WDM transceiver 1200 is an embodiment of variation-tolerant WDM transceiver 100, FIG. 1. WDM transmitter 1210 and variation-tolerant receiver 1240 are similarly embodiments, respectively, of transmitter 110 and receiver 140, FIG. 1. Broadband light source 1202 is an embodiment broadband light source 202, FIG. 2.

In an embodiment, environment 1220 is a multicore processor and devices 1250 are each processor cores. In different embodiment, environment 1220 is a server and devices 1250 are each multicore processors. In another embodiment, environment 1220 is a geographic area and devices 1250 are each cellular network base stations. In another embodiment, environment 1220 is a sensing region for a sensor system and devices 1250 are each sensors.

Figure 13:
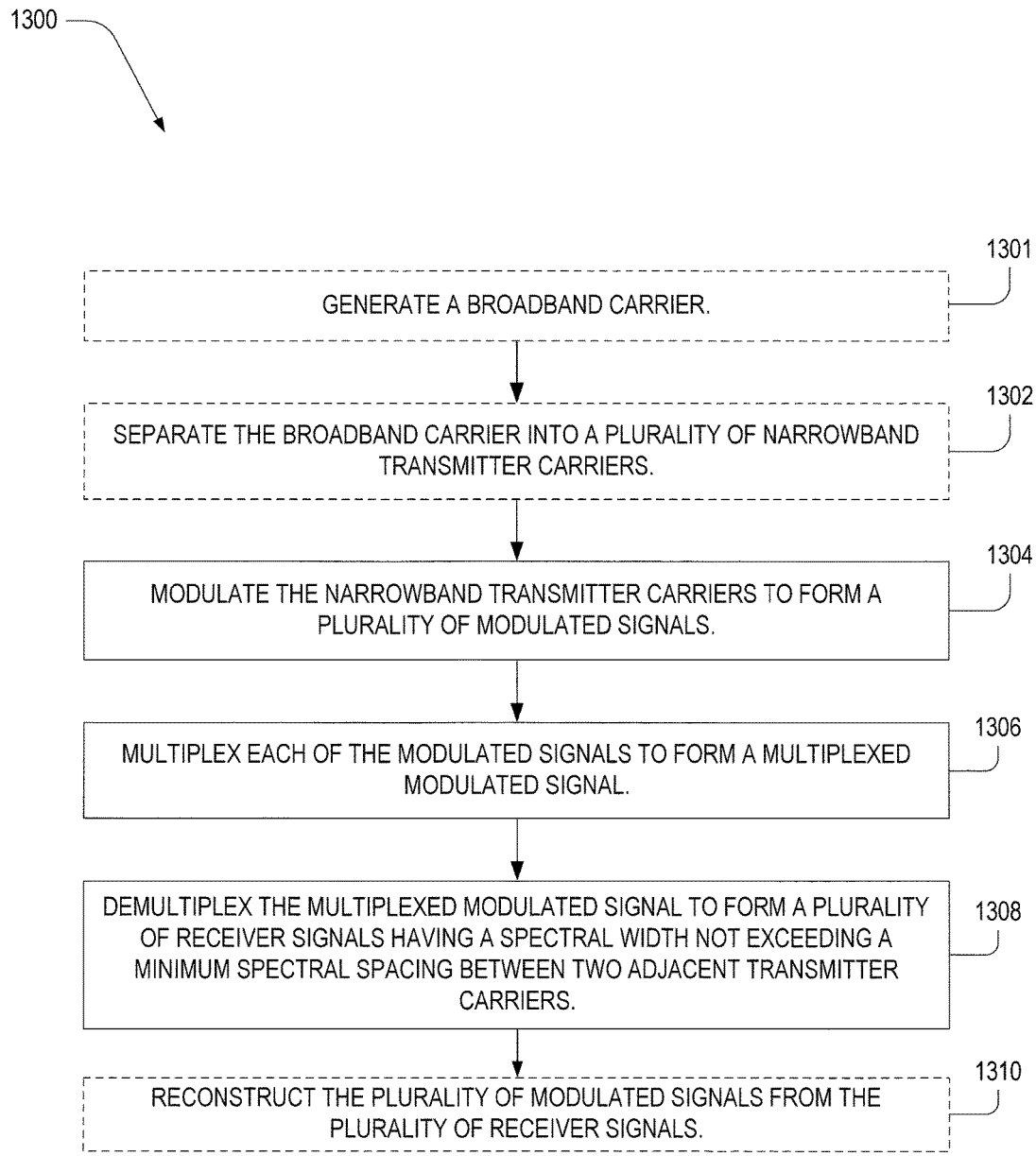
FIG. 13 is a flowchart illustrating a method for passively compensating transmitter-receiver channel mismatch in a transceiver, in an embodiment.

FIG. 13 is a flowchart illustrating a method 1300 for passively compensating transmitter-receiver channel mismatch in a transceiver. Step 1301 is optional. If included, in step 1301, method 1300 generates a broadband carrier. In an example of step 1301, light source 202 generates broadband carrier 203.

Step 1302 is optional. If included, in step 1302, method 1300 separates the broadband carrier into a plurality of narrowband transmitter carriers. In an example of step 1302, add/drop filters 274 separate broadband carrier 203 into a plurality of narrowband transmitter carriers 204. In step 1304, method 1300 modulates narrowband transmitter carriers to form a plurality of modulated signals. In an example of step 1304, modulators 225 modulate narrowband transmitter carriers 204 to form a plurality of modulated signals 205. In step 1306, method 1300 multiplexes each of the modulated signals to form a multiplexed modulated signal. In an example of step 1306, combiner network multiplexes modulated signals 205 to form a multiplexed modulated signal 233.

In step 1308, method 1300 demultiplexing the multiplexed modulated signal to form a plurality of receiver signals, each receiver signal having a spectral width not exceeding a minimum spectral spacing between two adjacent transmitter carriers. In an example of step 1308, variation-tolerant receiver 240 demultiplexes multiplexed modulated signal 233 to form a plurality of receiver signals 265, which, for example, correspond to receiver channels 740 of FIG. 7. Each receiver channels 740 has a spectral width 774 not exceeding a minimum inter-channel spacing 766 between two adjacent transmitter channels 710(1) and 710 (2), which, for example, correspond to transmitter carriers 204(1) and 204(2). Step 1310 is optional. If included, in step 1310, method 1300 reconstructs the plurality of modulated signals from the plurality of receiver signals. In an example of step 1310, signal reconstructor 241 reconstructs modulated signals 205 from receiver signals 265.

Figure 14:
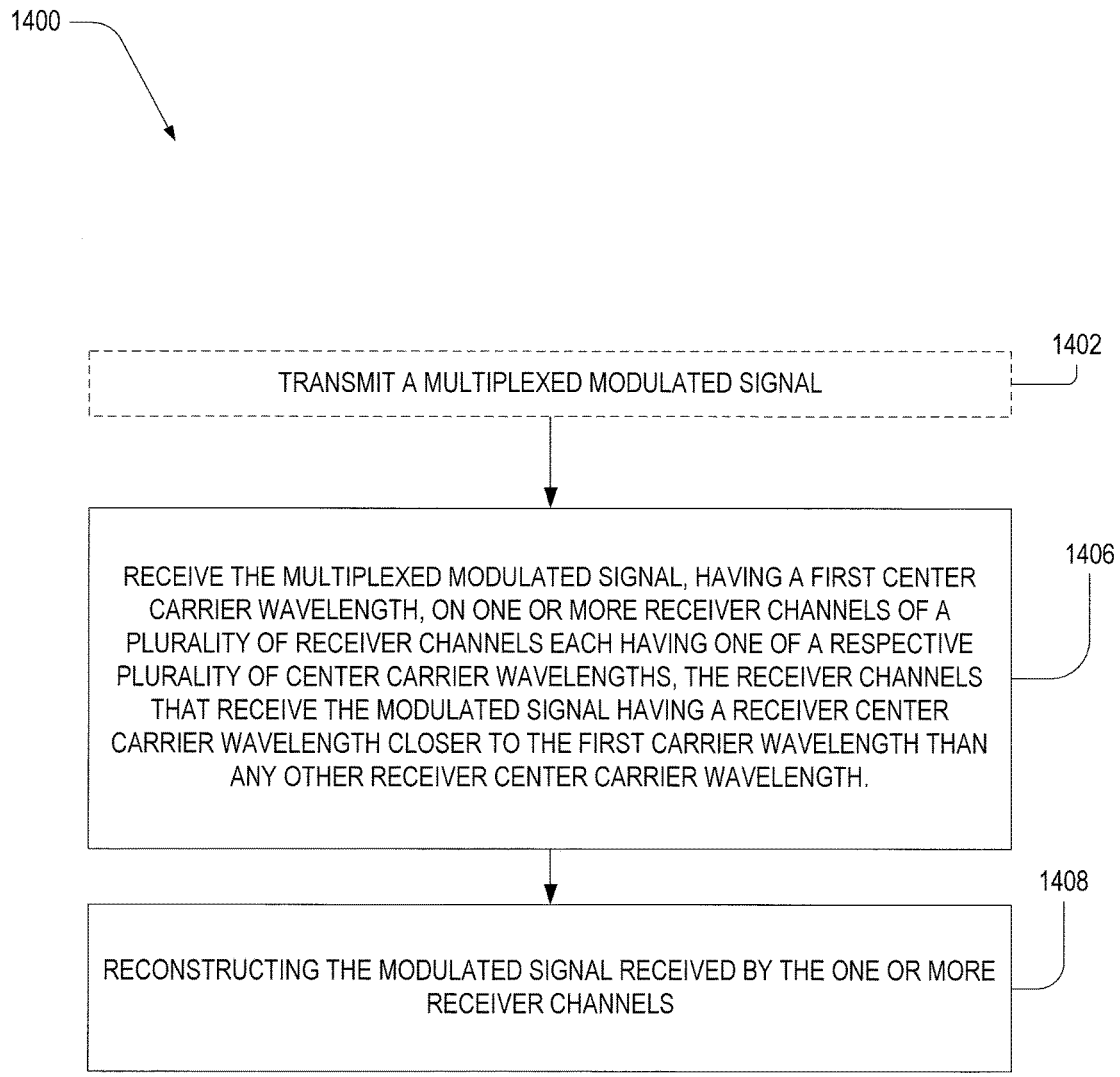
FIG. 14 is a flowchart illustrating a method for variation-tolerant signal reconstruction, in an embodiment.

FIG. 14 is a flowchart illustrating a method 1400 for variation-tolerant signal reconstruction. In step 1406, method 1400 receives a multiplexed modulated signal, having a first center carrier wavelength, on one or more receiver channels of a plurality of receiver channels each having one of a respective plurality of center carrier wavelengths. The receiver channels that receive the modulated signal have a receiver center carrier wavelength closer to the first carrier wavelength than any other receiver center carrier wavelength. In an example of step 1406, variation-tolerant receiver 640 (FIG. 6) receives multiplexed modulated signal 633 having a first center carrier wavelength corresponding to transmitted channel 710(1), on receiver channels 740(3) and 740(4) of complete channel group 750.

Method 1400 may also include step 1408. If included, in step 1408, method 1400 reconstructs the multiplexed modulated signal received by the one or more receiver channels. In an example of step 1408, signal reconstructor 641 reconstructs multiplexed modulated signal 633 received by receiver channels 740(3) and 740(4).

Method 1400 may also include step 1402. If included, in step 1402, method 1400 transmits the multiplexed modulated signal. In an example of step 1402, WDM transmitter 650 transmits multiplexed modulated signal 633.

Combinations of Features

Features described above as well as those claimed below may be combined in various ways without departing from the scope hereof. For example, it will be appreciated that aspects of a variation-tolerant WDM transceiver described herein may incorporate or swap features of another variation-tolerant WDM transceiver described herein. Similarly, aspects of a variation-tolerant WDM receiver described herein may incorporate or swap features of another variation-tolerant WDM receiver described herein. The following examples illustrate possible, non-limiting combinations of embodiments described above. It should be clear that many other changes and modifications may be made to the methods and device herein without departing from the spirit and scope of this invention:

(A1) A variation-tolerant receiver including a plurality of receiver resonators configured to demultiplex a multiplexed modulated signal received from at least one wavelength division multiplexing (WDM) transmitter having a plurality of transmitter resonators and wherein operationally each of the receiver resonators has a receiver resonance linewidth not exceeding a minimum spacing between two adjacent transmitter resonances of the transmitter resonators. The receiver resonances collectively spanning a free spectral range of one of the receiver resonators such that the variation-tolerant receiver achieves gapless spectral response.

(A2) A variation-tolerant receiver comprising a plurality of receiver resonators configured to demultiplex a multiplexed modulated signal received from a remotely-located wavelength division multiplexing (WDM) transmitter having a plurality of transmitter resonators, each receiver resonator having an perimeter, shape, and cross-sectional dimensions, and bulk refractive index that determine a plurality of receiver resonances each having a receiver resonance linewidth in response to electromagnetic radiation propagating therethrough; each receiver resonance linewidth not exceeding a minimum spacing between two adjacent transmitter resonances of the transmitter resonators; and all receiver resonances collectively spanning a free spectral range of one of the receiver resonators such that the variation-tolerant receiver achieves gapless spectral response.

(A3) In one or both of the variation-tolerant receivers denoted as (A1) and (A2), a center-to-center wavelength difference between any two adjacent receiver resonances being between 0.5 times and 1.5 times a linewidth of either one of said adjacent receiver resonances, such that any two adjacent receiver resonances overlap each other.

(A4) In any of the variation-tolerant receivers denoted as (A1) through (A3), a linewidth of each receiver resonator being equal and number of receiver resonators equals or exceeds quotient of a receiver resonator FSR and the linewidth.

(A5) In any of the variation-tolerant receivers denoted as (A1) through (A4), the number of receiver resonators being at least twice number of transmitter resonators.

(A6) In any of the variation-tolerant receivers denoted as (A1) through (A5), a smallest FSR of any of the receiver resonators exceeding a maximum FSR of any of the transmitter resonators.

(A7) In any of the variation-tolerant receivers denoted as (A1) through (A6), number of receiver resonances being centered within a full-width at half maximum of a transmitter resonance, the number equaling or exceeding total number of transmitter resonators when operating at any temperature between 25° C. and 50° C.

(A8) In any of the variation-tolerant receivers denoted as (A1) through (A7), linewidth of each receiver resonator equaling linewidth of each transmitter resonator.

(A9) In the variation-tolerant receivers denoted as (A7), number of receiver resonators being greater than or equal to finesse of a transmitter resonator (A10) In any of the variation-tolerant receivers denoted as (A1) through (A9), each adjacent pair of transmitter resonances being separated in wavelength $\Delta\lambda$ and having respective spectral widths $\delta\lambda_1$ and $\delta\lambda_2$, $\Delta\lambda$ exceeding $\frac{1}{2}(\delta\lambda_1+\delta\lambda_2)$.

(A11) In the variation-tolerant receivers denoted as (A10), a guard band between each adjacent pair of transmitter resonances having a spectral width equal to $\Delta\lambda-\frac{1}{2}(\delta\lambda_1+\delta\lambda_2)$, the spectral width exceeding characteristic spectral shift of transmitter resonance resulting from process variation.

(A12) In any of the variation-tolerant receivers denoted as (A1) through (A12), the variation-tolerant receiver being a silicon-on-insulator device.

(A13) In any of the variation-tolerant receivers denoted as (A1) through (A12), a receiver resonator being one of a microring resonator and a racetrack resonator.

(A14) In any of the variation-tolerant WDM transceivers denoted as (A1) though (A13), also including a signal reconstructor.

(B1) A variation-tolerant WDM transceiver including a plurality of transmitter resonators, each of said transmitter resonators having a transmitter resonance; and a plurality of receiver resonators, each of said receiver resonators having a receiver resonance linewidth not exceeding a minimum spacing between two adjacent transmitter resonances of the transmitter resonators, and all receiver resonances collectively spanning a free spectral range of one receiver resonator such that the variation-tolerant receiver achieves gapless spectral response.

(B2) A variation-tolerant WDM transceiver, including a plurality of transmitter resonators, each of said transmitter resonators having a transmitter resonance; and a plurality of receiver resonators, each of said receiver resonators having perimeter, shape, cross-sectional dimensions, and bulk refractive index such that operationally (a) each receiver resonance linewidth does not exceed a minimum spacing between two adjacent transmitter resonances and (b) the receiver resonances collectively span a free spectral range of one receiver resonator to achieve gapless spectral response.

(B3) In one or both of the variation-tolerant WDM transceivers denoted as (B1) and (B2), a center-to-center wavelength difference between any two adjacent receiver resonances being between 0.5 times and 1.5 times a linewidth of either adjacent receiver resonance, such that any two adjacent receiver resonances overlap each other.

(B4) In any of the variation-tolerant WDM transceivers denoted as (B1) through (B3), each receiver resonance linewidth being equal, number of receiver resonators equaling or exceeding quotient of a receiver resonator FSR and the receiver resonance linewidth.

(B5) In any of the variation-tolerant WDM transceivers denoted as (B1) though (B4), number of receiver resonators being at least twice the number of transmitter resonators.

(B6) In any of the variation-tolerant WDM transceivers denoted as (B1) though (B5), a smallest FSR of any receiver resonator exceeding a maximum FSR of any transmitter resonator.

(B7) In any of the variation-tolerant WDM transceivers denoted as (B1) though (B6), number of receiver resonances being centered within a full-width at half maximum of a transmitter resonance, the number equaling or exceeding number of transmitter resonators at any temperature between 25° C. and 50° C.

(B8) In any of the variation-tolerant WDM transceivers denoted as (B1) though (B6), linewidth of each receiver resonator equaling linewidth of each transmitter resonator.

(B9) In the variation-tolerant WDM transceivers denoted as (B8), number of receiver resonators being greater than or equal to finesse of a transmitter resonator.

(B10) In any of the variation-tolerant WDM transceivers denoted as (B1) though (B9), each adjacent pair of transmitter resonances being separated in wavelength $\Delta\lambda$ and having respective spectral widths $\delta\lambda_1$ and $\delta\lambda_2$, $\Delta\lambda$ exceeding $\frac{1}{2}(\delta\lambda_1+\delta\lambda_2)$.

(B11) In the variation-tolerant WDM transceivers denoted as (B10), a guard band between each adjacent pair of transmitter resonances having a spectral width equal to $\Delta\lambda-\frac{1}{2}(\delta\lambda_1+\delta\lambda_2)$, the spectral width exceeding characteristic spectral shift of transmitter resonance resulting from process variation.

(B12) In any of the variation-tolerant WDM transceivers denoted as (B1) though (B11), the variation-tolerant receiver being a silicon-on-insulator device.

(B13) In any of the variation-tolerant WDM transceivers denoted as (B1) though (B12), the variation-tolerant receiver being a silicon-on-insulator device.

(B14) In any of the variation-tolerant WDM transceivers denoted as (B1) though (B13), one or both of a transmitter resonator being one of a microring resonator and a racetrack resonator; and a receiver resonator being one of a microring resonator and a racetrack resonator.

(B15) In any of the variation-tolerant WDM transceivers denoted as (B1) though (B14), the variation-tolerant WDM transceiver also including a broadband light source optically coupled to the plurality of transmitter resonators.

(B16) In the variation-tolerant WDM transceiver denoted as (B15), the broadband light source having a bandwidth exceeding an FSR of each transmitter resonator.

(B17) In any of the variation-tolerant WDM transceivers denoted as (B1) though (B16), also including a signal reconstructor.

Changes may be made in the above method, receivers, and transceivers without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A variation-tolerant receiver comprising:
    a plurality of receiver resonators for demultiplexing a multiplexed modulated signal received from at least one wavelength division multiplexing (WDM) transmitter having a plurality of transmitter resonators, each of the receiver resonators having a receiver resonance linewidth not exceeding a minimum spacing between two adjacent transmitter resonances of the transmitter resonators; and
    the receiver resonances collectively spanning a free spectral range of one of the receiver resonators such that the variation-tolerant receiver achieves gapless spectral response.

2. The variation-tolerant receiver of claim 1, a center-to-center wavelength difference between any two adjacent receiver resonances being between 0.5 times and 1.5 times a linewidth of either one of said adjacent receiver resonances, such that any two adjacent receiver resonances overlap each other.

3. The variation-tolerant receiver of claim 1, a linewidth of each receiver resonator being equal and number of receiver resonators equaling or exceeding quotient of (a) a receiver resonator free-spectral range (FSR) and (b) the linewidth.

4. The variation-tolerant receiver of claim 1, the number of receiver resonators being at least twice number of transmitter resonators.

5. The variation-tolerant receiver of claim 1, a smallest FSR of any of the receiver resonators exceeding a maximum FSR of any of the transmitter resonators.

6. The variation-tolerant receiver of claim 1, number of receiver resonances being centered within a full-width at half maximum of a transmitter resonance, and equaling or exceeding total number of transmitter resonators when operating at any temperature between 25° C. and 50° C.

7. The variation-tolerant receiver of claim 1, linewidth of each receiver resonator equaling linewidth of each transmitter resonator.

8. The variation-tolerant receiver of claim 7, number of receiver resonators being greater than or equal to finesse of a transmitter resonator.

9. The variation-tolerant receiver of claim 1, each adjacent pair of transmitter resonances being separated in wavelength $\Delta\lambda$ and having respective spectral widths $\delta\lambda_1$ and $\delta\lambda_2$, $\Delta\lambda$ exceeding $1/2(\delta\lambda_1+\delta\lambda_2)$.

10. The variation-tolerant receiver of claim 9, a guard band between each adjacent pair of transmitter resonances having a spectral width equal to $\Delta\lambda-1/2(\delta\lambda_1+\delta\lambda_2)$, that exceeds characteristic spectral shift of transmitter resonance resulting from process variation.

11. The variation-tolerant receiver of claim 1, each receiver resonator being a silicon-on-insulator device.

12. The variation-tolerant receiver of claim 1, further comprising a proximally-located variation-tolerant WDM transceiver having a plurality of proximal transmitter resonators, each resonators having a transmitter resonance; and receiver resonance linewidth not exceeding a minimum spacing between two adjacent transmitter resonances of the proximal transmitter resonators.

13. The variation-tolerant WDM transceiver of claim 12, wherein
    a proximal transmitter resonator comprises one of a microring resonator and a racetrack resonator and/or wherein a receiver resonator comprises one of a microring resonator and a racetrack resonator.

14. The variation-tolerant WDM transceiver of claim 12, further comprising a broadband light source optically coupled to the plurality of proximal transmitter resonators and having a bandwidth exceeding an FSR of each proximal transmitter resonator.

15. A variation-tolerant receiver comprising a plurality of receiver resonators configured to demultiplex a multiplexed modulated signal received from a remotely-located wavelength division multiplexing (WDM) transmitter having a plurality of transmitter resonators,
    each receiver resonator having perimeter, shape, cross-sectional dimensions, and bulk refractive index that determine a plurality of receiver resonances each having a receiver resonance linewidth in response to electromagnetic radiation propagating therethrough;
    each receiver resonance linewidth not exceeding a minimum spacing between two adjacent transmitter resonances of the transmitter resonators; and
    all receiver resonances collectively spanning a free spectral range of one of the receiver resonators such that the variation-tolerant receiver achieves gapless spectral response.

16. The variation-tolerant receiver of claim 15, further comprising a proximally-located WDM transmitter having a plurality of proximal transmitter resonators, each receiver resonance linewidth not exceeding a minimum spacing between two adjacent transmitter resonances of the proximal transmitter resonators.

17. A method for passively compensating transmitter-receiver channel mismatch in a transceiver, comprising:
    modulating a plurality of narrowband transmitter carriers to form a plurality of modulated signals;
    multiplexing each of the modulated signals to form a multiplexed modulated signal; and
    demultiplexing the multiplexed modulated signal to form a plurality of receiver signals, each receiver signal having a spectral width not exceeding a minimum spectral spacing between two adjacent transmitter carriers.

18. A method for variation-tolerant signal reconstruction, comprising:
    receiving a multiplexed modulated signal, having a first center carrier wavelength, on one or more receiver channels of a plurality of receiver channels each having one of a respective plurality of center carrier wavelengths, the receiver channels that receive the modulated signal having a receiver center carrier wavelength closer to the first carrier wavelength than any other receiver center carrier wavelength.

19. The method of claim 18, the modulated signal having an associated transmitter channel that is one of a first plurality of transmitter channels, each having one of a respective plurality of center carrier wavelengths.

20. The method of claim 18, the number of receiver channels being at least twice the number of transmitter channels.

\* \* \* \* \*